(12) United States Patent
Czarnek

(10) Patent No.: US 6,192,754 B1
(45) Date of Patent: *Feb. 27, 2001

(54) SENSOR SYSTEM FOR MEASURING DISPLACEMENTS

(75) Inventor: Robert Czarnek, Johnstown, PA (US)

(73) Assignee: Czarnek and Orkin Laboratories, Inc., Highland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/057,811

(22) Filed: Apr. 9, 1998

Related U.S. Application Data

(63) Continuation-in-part of application No. PCT/US96/15092, filed on Sep. 19, 1996, and a continuation-in-part of application No. 09/044,300, filed on Mar. 19, 1998.
(60) Provisional application No. 60/003,969, filed on Sep. 19, 1995.

(51) Int. Cl.⁷ .............................. G01F 23/38; G01F 23/00
(52) U.S. Cl. ...................... 73/313; 73/DIG. 5; 73/290 R
(58) Field of Search ............................ 73/308, 309, 313, 73/314, 322.5, 447, DIG. 5, 301, 290 R; 336/30; 340/624; 137/429; 324/207.24; 361/178

(56) References Cited

U.S. PATENT DOCUMENTS

| | | |
|---|---|---|
| 2,424,766 | 7/1947 | Miner .................................. 171/119 |
| 2,452,156 | 10/1948 | Schover ............................... 177/351 |
| 3,703,829 * | 11/1972 | Dougherty ......................... 73/290 R |
| 3,834,234 | 9/1974 | Kobayashi et al. ................ 73/290 R |
| 3,896,671 | 7/1975 | Marinaccio ........................ 73/304 R |
| 3,921,461 | 11/1975 | Layton ................................... 73/447 |
| 3,948,100 | 4/1976 | Paris et al. ......................... 73/290 R |
| 3,996,801 * | 12/1976 | Playfoot et al. ................... 73/304 R |
| 4,052,900 | 10/1977 | Ganderton .............................. 73/313 |
| 4,091,671 | 5/1978 | McLees .................................. 73/313 |
| 4,279,149 * | 7/1981 | Block ................................. 73/290 R |
| 4,282,485 | 8/1981 | Pauwels et al. ....................... 324/208 |
| 4,447,743 | 5/1984 | Bean et al. ............................ 307/118 |
| 4,513,617 | 4/1985 | Hayes ..................................... 73/313 |
| 4,627,280 * | 12/1986 | Hayashi et al. .................... 73/290 R |
| 4,724,705 | 2/1988 | Harris ..................................... 73/313 |
| 4,771,804 | 9/1988 | Morales ................................ 137/412 |
| 4,783,626 * | 11/1988 | Shimizu ............................. 73/862.33 |
| 4,799,047 | 1/1989 | Saitoh ................................... 340/618 |
| 4,831,878 | 5/1989 | Hayashi et al. ......................... 73/313 |
| 4,833,919 | 5/1989 | Saito et al. ............................. 73/313 |
| 4,887,465 | 12/1989 | Bryne et al. ........................... 73/313 |
| 4,891,980 * | 1/1990 | Kawai et al. ....................... 73/290 R |
| 4,950,988 | 8/1990 | Garshelis ........................ 324/207.24 |
| 5,061,896 | 10/1991 | Schmidt ........................... 324/207.18 |
| 5,078,010 | 1/1992 | Lock .................................. 73/304 R |
| 5,103,674 | 4/1992 | Outwater et al. ....................... 73/319 |
| 5,138,881 | 8/1992 | Riley et al. ......................... 73/304 R |
| 5,146,784 | 9/1992 | Maresca, Jr. et al. ................. 73/313 |
| 5,150,615 * | 9/1992 | Rymut et al. .......................... 73/313 |
| 5,291,782 | 3/1994 | Taylor ................................... 73/319 |

FOREIGN PATENT DOCUMENTS 0211142  2/1987  (EP) ............................. G01D/5/20

* cited by examiner

*Primary Examiner*—Helen C. Kwok
(74) *Attorney, Agent, or Firm*—Webb Ziesenheim Logsdon Orkin & Hanson, P.C.

(57) ABSTRACT

A sensor system for measuring displacement includes a first member having a primary coil and a pair of secondary coils wound around a longitudinal axis thereof. The secondary coils have a periodically varying winding density distribution. The winding density distribution of one secondary coil is shifted relative to the winding density distribution of the other secondary coil. A second member positioned adjacent the first member modifies an electromagnetic field produced by the primary coil. In response to the modified electromagnetic field, the first and secondary coils produce first and second signals having amplitudes that vary periodically in response to relative movement between the first member and the second member.

32 Claims, 19 Drawing Sheets

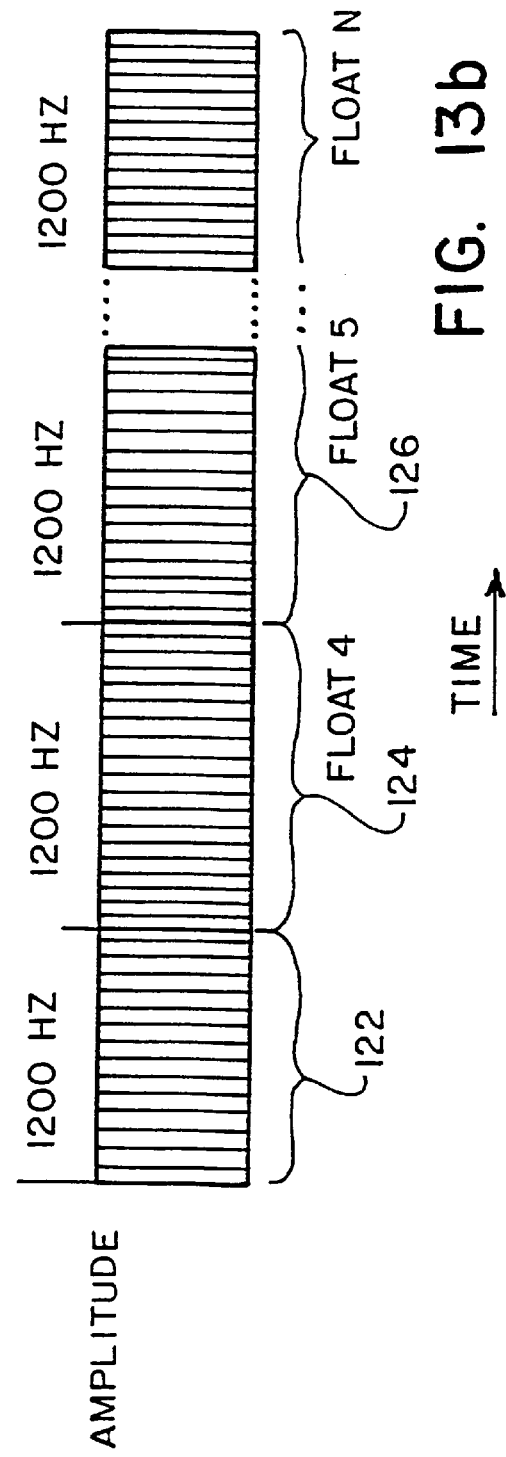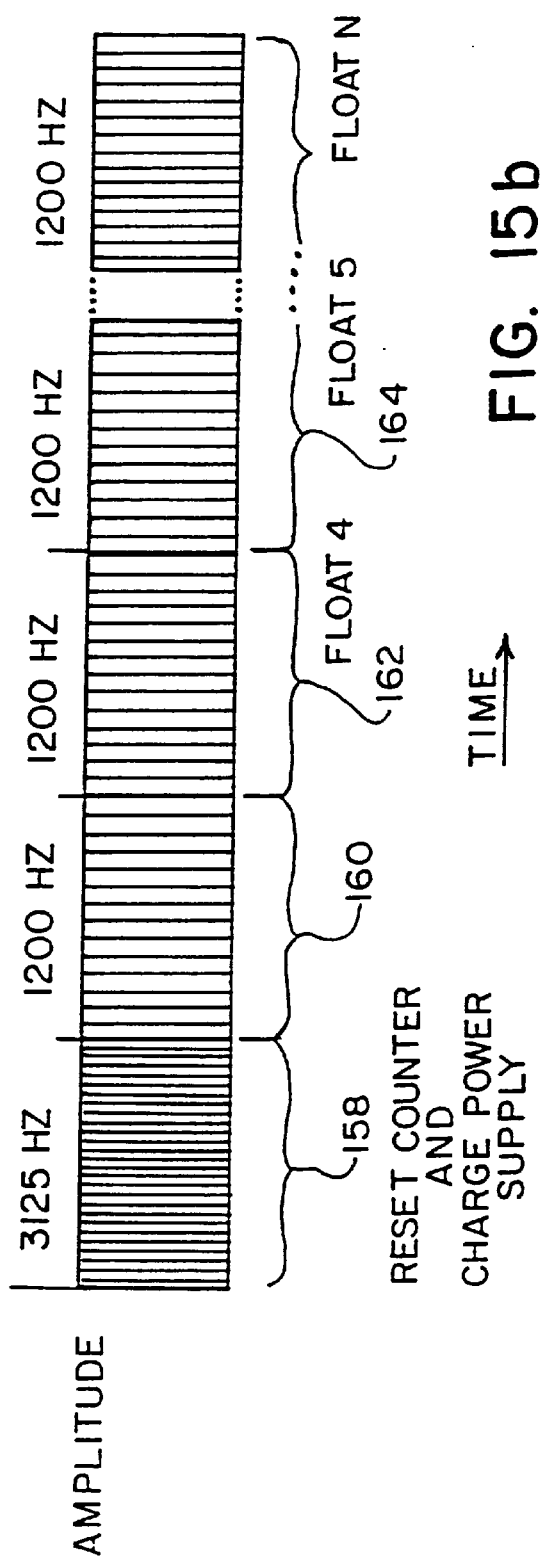

SENSOR SYSTEM FOR MEASURING DISPLACEMENTS

CROSS REFERENCE TO RELATED APPLICATIONS

This application claims the benefit of U.S. Provisional Patent application Ser. No. 60/003,969, filed Sep. 19, 1995 and is a continuation-in-part of International Application No. PCT/US96/15092, filed Sep. 19, 1996 and is a continuation-in-part of U.S. Continuation-in-Part application Ser. No. 09/044,300, filed Mar. 19, 1998.

BACKGROUND OF THE INVENTION

1. Field of the Invention

This invention relates to a sensor system for monitoring fluid level and displacement and, more particularly, to a sensor system for monitoring the level of crude oil in storage containers and displacement of parts.

2. Background Art

There are many types of sensors known in the art for monitoring fluid level and displacement of parts, and especially for measuring the level of crude oil in storage containers. Many of these sensors utilize a float designed to interact with the sensor. These sensors can be expensive in order to obtain the accuracy necessary and are often affected by the fluids and other contaminates associated with storage containers in which such fluids are stored. The following is a listing of known sensors for monitoring or measuring fluid level and disadvantages of such sensors.

Linearly Variable Differential Transformers (VDT) require high precision manufacturing of the coils and a sensor length of more than two times the useful length of the sensor. They also have resolution that is limited by the resolution of their data acquisition system and by the electrical noise of the whole system.

Ultrasonic transducers are affected by changes in pressure, temperature and other variations in the composition of the media in which they operate due to their sensitivity to the density of the media. This limitation thereby increases the probability of errors.

Reed switch arrays, used in the oil industry, provide an incremental readout with limited resolution. However, they are sensitive to shock and vibrations and can be damaged by electrical storms. Furthermore, they are labor intensive to manufacture, which makes them expensive, and are unreliable due to the hundreds of switch contacts and internal connections. The accuracy of such arrays is typically +/−6.4 mm and clearance required between a float used with such reed switch arrays and the sensor elements must be between 0–3 mm. The arrays also require yearly cleaning and float replacement due to contaminant buildup.

Optical encoders are sensitive to contamination and are expensive. They also require high precision during manufacturing and implementation.

Magnetostrictive wave guide transducers are expensive and require high precision electronics. Also, the clearance between the float and the sensing element is limited.

Radar is expensive and has limited accuracy.

Capacitive probes are expensive and very sensitive to contamination. They also require high precision electronics and have a limited range.

Pressure transducers can be affected by contamination and have a resolution limited by the acquisition system employed.

It is an object of the present invention to provide a fluid sensor system that is inexpensive and easy to manufacture, has high reliability and accuracy, is easy to implement, and has a low sensitivity to contamination, shock, electrical storms and the media in which it operates.

It is an object of the present invention to provide a fluid sensor system having a float that includes an activatable resonator circuit.

It is an object of the present invention to provide a fluid sensor system having two or more floats each responsive to a different frequency excitation signal.

It is an object of the present invention to provide a fluid sensor system having two or more floats each responsive to a common excitation frequency and each having a resonating circuit that is activatable independent of resonating circuits of other floats.

It is an object of the present invention to provide a displacement measuring system.

SUMMARY OF THE INVENTION

In accordance with one aspect of the invention, a sensor system is provided for measuring displacement. The sensor system includes a first member having a first end, a second end and a longitudinal axis extending therebetween. The sensor system further includes a second member adapted to move adjacent the first member between the ends thereof and a control system. A primary coil is wound around the longitudinal axis between the first end and second end of the first member. The primary coil produces a time varying electromagnetic field adjacent the first member in response to a time varying signal output by the control system. A first secondary coil is wound around the longitudinal axis at a first periodically varying winding density distribution between the ends of the first member. A second secondary coil is wound at the first periodically varying winding density distribution around the longitudinal axis between the ends of the first member. The winding density distribution of the second secondary coil is shifted relative to the winding density distribution of the first secondary coil. In response to excitation by the time varying electromagnetic field, the first and second secondary coils produce first and second signals having amplitudes that vary periodically in response to movement of the second member between the ends of the first member.

The sensor system can include a third secondary coil wound at a monotonically varying winding density distribution around the longitudinal axis between the ends of the first member. In response to excitation by the time varying electromagnetic field, the third secondary coil produces signals having amplitudes that vary monotonically in response to movement of the second member between the ends of the first member. Alternatively, the sensor system can include third and fourth secondary coils wound around the longitudinal axis at a second periodically varying winding density distribution between the ends of the primary coil. In this alternative, in response to excitation by the time varying electromagnetic field, the third and fourth secondary coils produce third and fourth signals having amplitudes that vary periodically in response to the movement of the second member between the ends of the first member. The winding density distributions of the first and second secondary coils are repeated N cycles between the ends of the first member, wherein N is greater than 1. The winding density distributions of the third and fourth secondary coils are repeated M cycles between the ends of the first member, wherein M equals one of (i) N+1 and (ii) a number that does not have a denominator in common with N other than the number one.

The second member of the sensor system includes a combination resonator coil and capacitor or a ferromagnetic core. Alternatively, the second member of the sensor system includes a resonator coil connected in parallel with a series connected capacitor and switch. A switch control circuit is connected to the resonator coil and is connected to control the operation of the switch. In response to the primary coil of the first member producing a time varying electromagnetic field at a first frequency, the resonator coil generates a signal at the first frequency. The signal is provided to the switch control circuit which controls the switch to be opened during a first interval determined by the first frequency and to be closed during a second interval determined by the first frequency. The first interval and the second interval occur at different intervals of time. Closing the switch connects the capacitor and the resonator coil in parallel to form a resonating circuit. The resonating circuit is active when the switch is closed and the capacitor and resonator coil are connected in parallel. The resonating circuit is inactive when the switch is open.

The switch control circuit can include a reset control responsive to the resonator coil generating a signal at a second frequency. In response to detecting the second frequency, the reset control generates a reset signal which resets a counter of the switch control circuit. The counter is utilized to detect a first predetermined number of cycles of the first frequency corresponding to the first interval and to detect a second predetermined number of cycles of the first frequency corresponding to the second interval. In response to detecting the cycles of the first frequency corresponding to the first interval and second interval, the counter causes the switch to be open and closed, respectively.

When the primary coil is excited at the first frequency, the control system samples during the first interval a compensation signal from each secondary coil. The compensation signals correspond to the response of each secondary coil to excitation by the primary coil when the resonating circuit is inactive. During the second interval, the control system samples a composite signal from each secondary coil. The compensation signal for each secondary coil is subtracted from the composite signal thereof to obtain an elemental signal corresponding to the actual response of each secondary coil to the resonating circuit.

Multiple second members with LC circuits tuned to different frequencies can be utilized to detect displacement of a like number of objects relative to a reference positions. To stimulate the second member, the excitation frequency of the primary coil is changed between readings. Alternatively, multiple second members tuned to the same frequency can be utilized. In this alternative, each second member tuned to the same frequency includes a resonating circuit having the resonator coil connected in parallel with the series connected capacitor and switch, and the switch control circuit connected to the resonator coil and connected to control the operation of the switch. The switch control circuits are preferably adapted so that the resonating circuits are each inactive for a first interval during which the control system samples the compensation signal from each secondary coil. Each switch control circuit is also adapted to activate its resonating circuits for a second interval. However, the second interval for each resonating circuit occurs at a different interval of time. During the second interval of each resonating circuit, the control system samples the composite signal from each secondary coil. To determine the response of each secondary coil to the activation of each resonating circuit, the compensation signal for each secondary coil is subtracted from the composite signals obtained for each secondary coil to obtain elemental signals corresponding to the actual response of each secondary coil to each resonating circuit. Moreover, the switch control circuits of each LC resonator can be responsive to a second frequency for causing a reset control thereof to generate a reset signal which causes a counter of the switch control circuit to reset.

In accordance with another aspect of the invention, a coil winding arrangement for use with a fluid level sensor system is provided. The coil winding arrangement includes a primary coil wound around a longitudinally extending axis wherein the primary coil has a first end and a second end. A first secondary coil is wound around a longitudinal axis between the ends of the primary coil. The first secondary coil has a winding density distribution that varies periodically between the ends of the primary coil. A second secondary coil is wound around the longitudinal axis between the ends of the primary coil. The second secondary coil has the first winding density distribution. The winding directions of the first and second secondary coils vary between a clockwise winding direction and a counterclockwise winding direction between the ends of the primary coil. The winding density distribution of the second secondary coil is shifted relative to the winding density distribution of the first secondary coil.

In accordance with another aspect of the invention, a method of detecting displacement is provided. In the method, a second member is positioned adjacent a primary coil wound around a longitudinal axis of a first member and a second secondary coil is wound around the longitudinal axis. The primary coil is excited with a periodically varying signal and first and second periodically varying signals are received from the first and second secondary coils. The phase and the amplitude of the first and second periodically varying signals are determined and translated into a first quadrature function and a second quadrature function. The position of the second member relative to the primary coil and to the first and second secondary coils is determined from the first and second quadrature functions.

In accordance with another aspect of the invention, a sensor system for measuring displacement is provided. The sensor system includes a first member having a first end, a second end and a longitudinal axis extending therebetween. A primary coil is wound around the longitudinal axis between the first end and the second end. A secondary coil is wound around the longitudinal axis at a monotonically varying winding density distribution between the first end and second end. The sensor system further includes a second member adapted to move adjacent the first member and a control system connected for providing a signal to the primary coil and for receiving a signal from the secondary coil. The second member includes a resonator adapted to generate a locally intense electromagnetic field in response to excitation of the primary coil by the control system.

A ferromagnetic shield can be provided on the second member and a compensating secondary coil can be provided on the first member to compensate for effects caused by external ferromagnetic elements.

The sensor system can be utilized in fluid and non-fluid displacement measuring applications where the first member and the second member are movable relative to each other to measure a fluid level or a displacement, such as a gap between rollers.

BRIEF DESCRIPTION OF THE DRAWINGS

FIG. 13b is a timing diagram of the operation of the resonating circuits of the floats in FIG. 13a;

FIG. 15b is a timing diagram of the operation of the resonating circuits of the floats in FIG. 15a;

FIG. 21b is a section of a portion of the sensor shown in FIG. 21a.

DETAILED DESCRIPTION OF THE PREFERRED EMBODIMENTS

Figure 1:
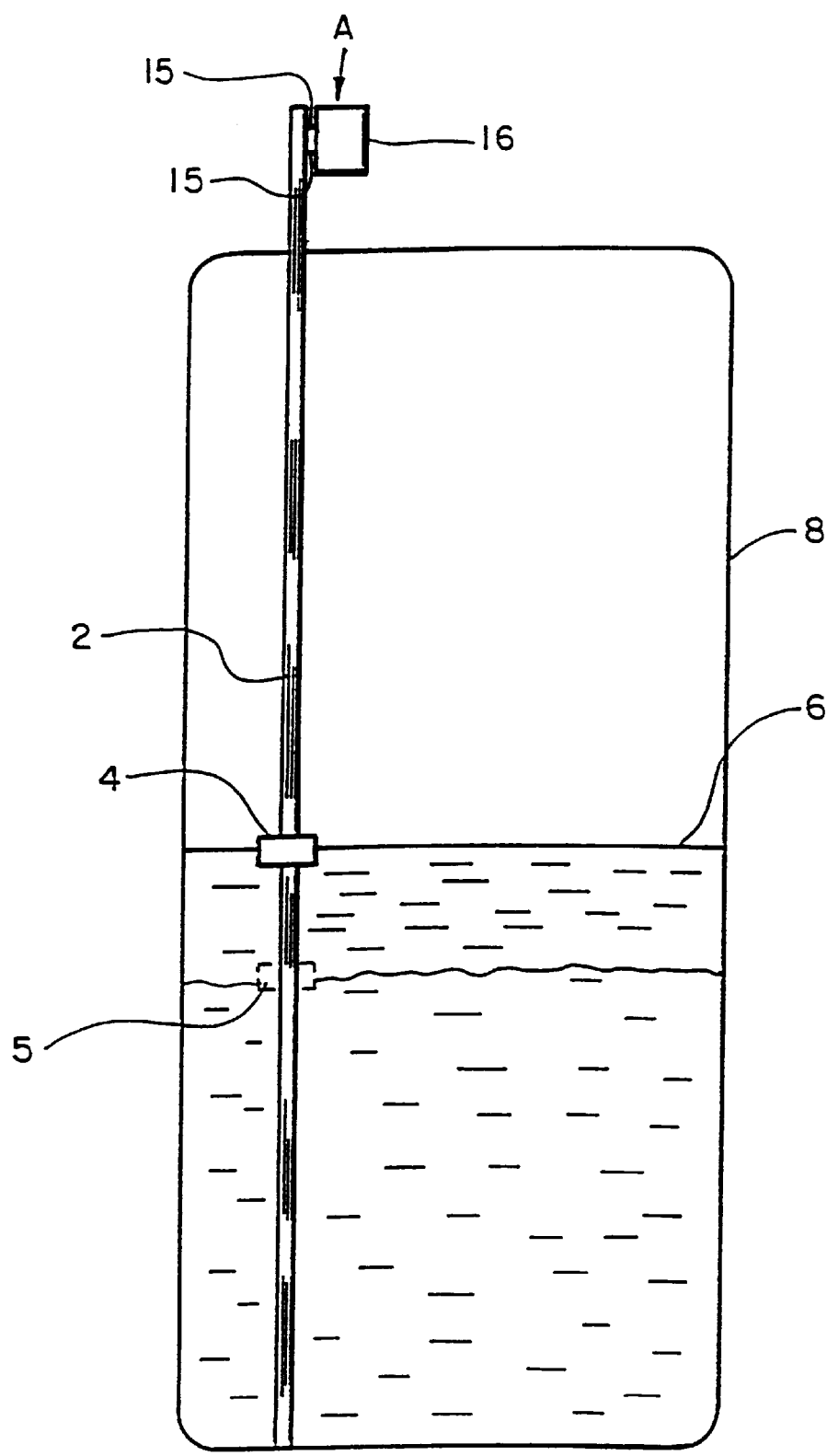
FIG. 1 is a side elevational view of a fluid sensor system in accordance with the present invention positioned to detect the level of a fluid.

With reference to FIG. 1, an inductive sensor system A of the present invention includes a tube 2 made of non-ferromagnetic material. A float 4, adapted to float on a fluid 6 disposed in a container 8 and adjacent tube 2, interacts with tube 2 in a manner that is to be described in greater detail hereinafter.

Figure 2:
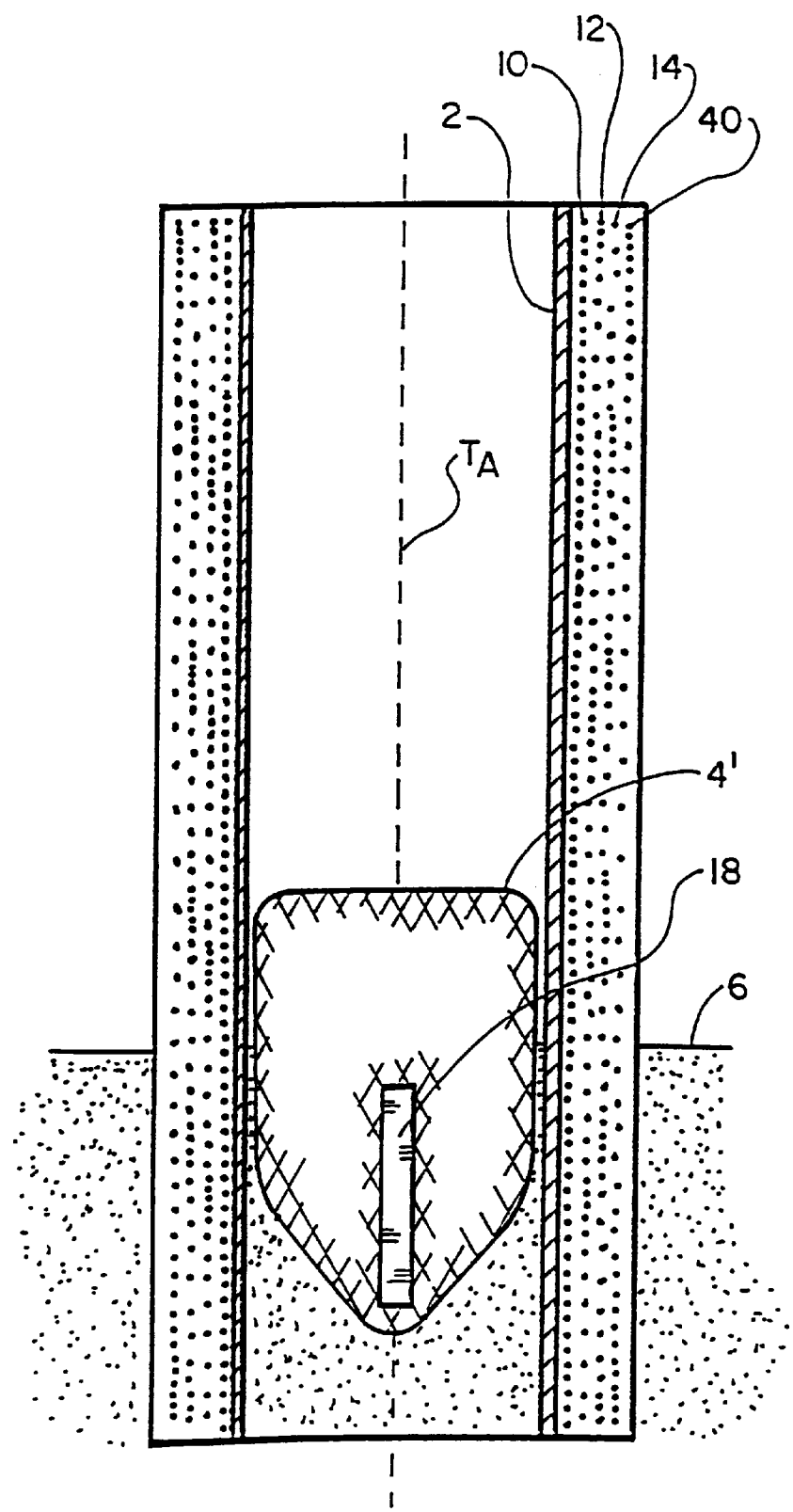
FIG. 2 is a sectional side elevational view of a portion of the sensor system in accordance with the present invention including a tube having coils thereabout and a float including a ferromagnetic core positioned in the float.

With reference to FIG. 2 and with continuing reference to FIG. 1, the tube 2 includes a plurality of coils layered coaxially and wound around or embedded into the tube 2 in a manner whereby each coil is electrically insulated from the other coils. The plurality of coils includes a primary coil 10, a first secondary coil 12 and a second secondary coil 14. The primary coil 10 is connected via connectors 15, or any other suitable arrangements for connecting the coils, to a control system 16 shown in FIG. 1 which provides a periodic driving signal to the primary coil 10. The secondary coils 12 and 14 are also connected via connectors 15 to the control system 16 which receives signals produced by the secondary coils 12 and 14 in response to changing magnetic flux passing therethrough. The control system 16 processes the received signals to a form to be analyzed by a monitoring computer.

A float 4' traveling inside the tube 2 has a ferromagnetic material core 18. In response to the driving signal from control system 16, the primary coil 10 produces a time varying electromagnetic field which interacts with float 4'. The float 4' modifies the electromagnetic field generated by the primary coil 10 to produce a locally intense electromagnetic field detectable by the secondary coils 12 and 14. The locally intense electromagnetic field detected by secondary coils 12 and 14 is converted by secondary coils 12 and 14 into electric signals which are detectable by signal-processing circuitry in the control system 16. The ferromagnetic core 18 intensifies the electromagnetic field by providing a low reluctance path for the electromagnetic field. Alternatively, the float 4' can be formed from material having a reduced reluctance path relative to the tube 2, the aperture formed by the tube 2 or the fluid 6 in and surrounding the tube 2.

Figure 3:
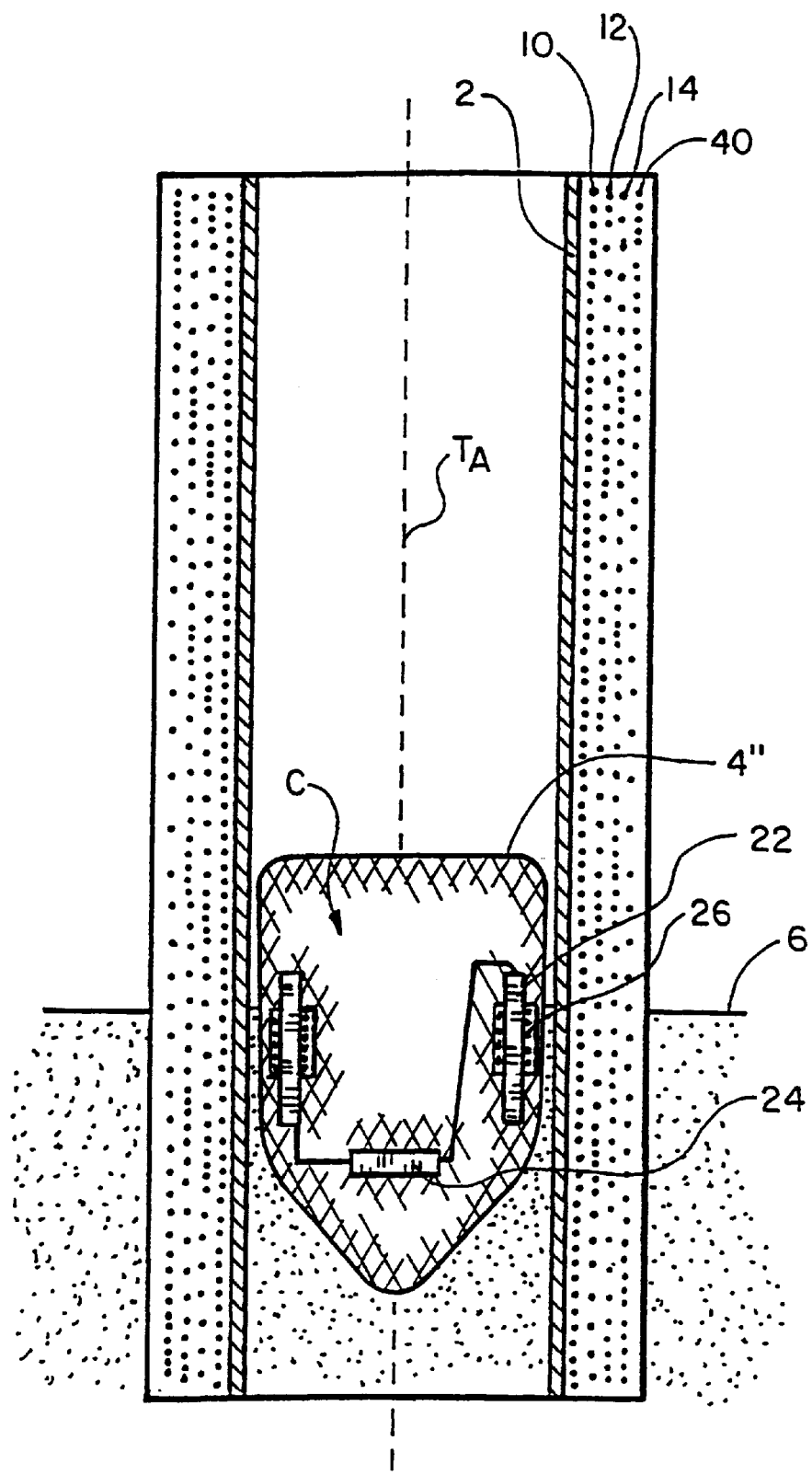
FIG. 3 is a sectional side elevational view of a portion of the sensor system in accordance with the present invention including the tube and coils illustrated in FIG. 2 and a float including an LC resonator therein.

With reference to FIG. 3, in another embodiment, a float 4" has an LC resonator C that includes a resonator coil 22 and a capacitor 24. The resonator coil 22 is preferably wound concentric with a longitudinal axis TA Of the tube 2. Electromagnetic fields produced by the primary coil 10 in response to excitation by control system 16 interact with the resonator coil 22 inducing oscillations in the LC resonator C. In response to the excitation frequency of the primary coil 10 being the same or near the resonance frequency of the LC resonator C, oscillations are produced in the LC resonator C. These oscillations produce a locally intense oscillating electromagnetic field in float 4" that induces electric signals in the windings of the secondary coils 12 and 14 adjacent float 4". The intensity of the oscillating electromagnetic field produced by the LC resonator C is approximately an order of magnitude greater than the intensity of the oscillating electromagnetic field produced by the interaction of float 4' containing ferromagnetic core 18 with a comparable intensity electromagnetic field produced by the primary coil 10. The intensity of the oscillating electromagnetic field produced by float 4" can be further increased if the resonator coil 22 of the LC resonator C is wound around a ferromagnetic core 26.

Figure 4:
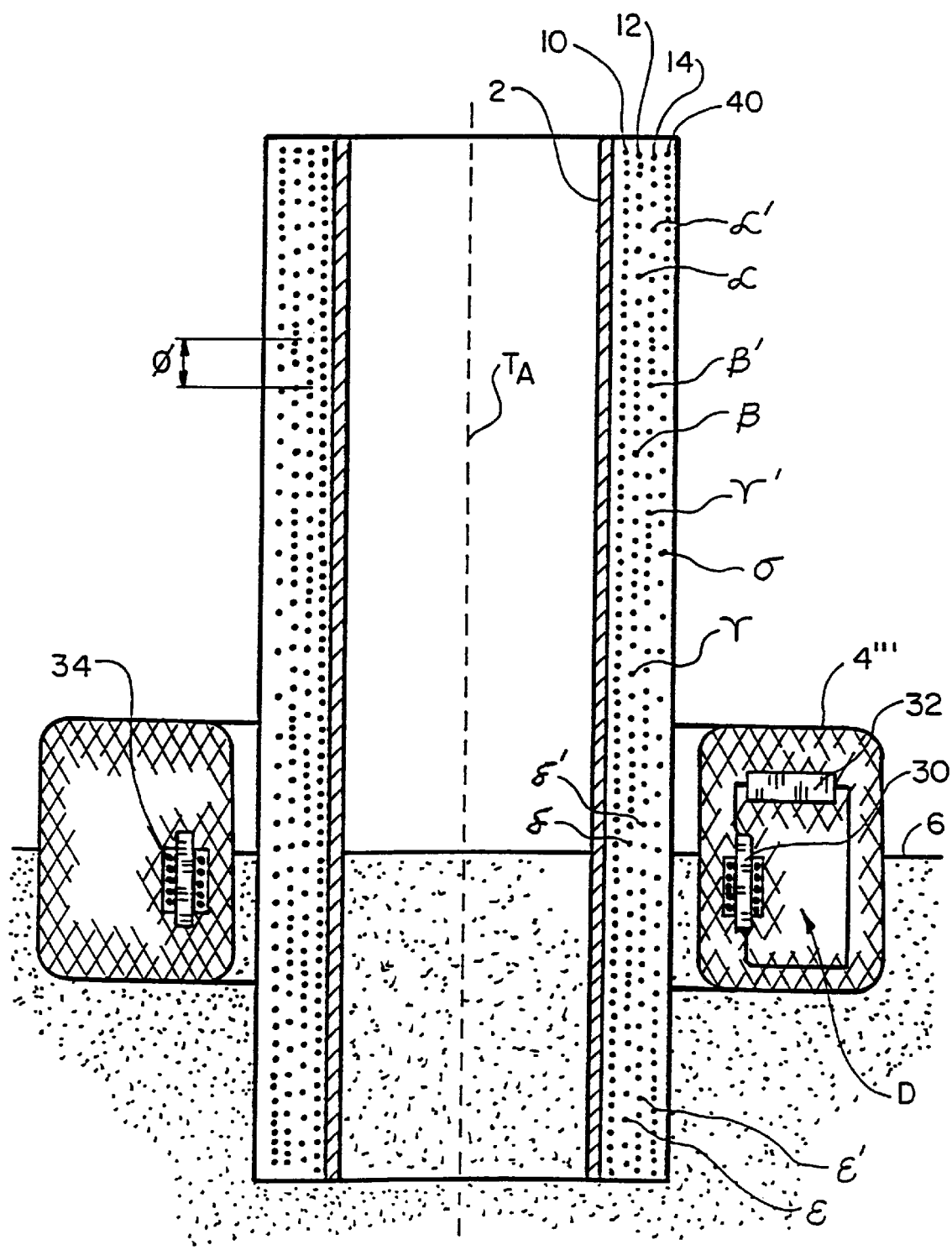
FIG. 4 is a sectional side elevational view of the tube and coils of the sensor systems of FIGS. 2 and 3 including a toroidal shaped float having an LC circuit disposed therein.

With reference to FIG. 4, a float 4''' can also be formed as a toroid surrounding the tube 2, such as shown in FIG. 1. In this embodiment, the float includes a doughnut-shaped coil 30 surrounding the tube 2 and connected to a capacitor 32 thereby forming LC resonator D. The resonance frequency of the LC resonator D in float 4''' is the same or near the excitation frequency of the primary coil 10. In response to the excitation of the primary coil 10 at or near the resonance frequency of the LC resonator D, oscillations are produced in the LC resonator D. These oscillations cause the LC resonator D to produce a locally intense oscillating electromagnetic field that induces electrical signals in the windings of first and second secondary coils 12 and 14 adjacent float 4'''. Alternatively, coil 30 can be wound around a ferromagnetic core 34.

The primary coil 10 is preferably wound at a constant winding density distribution, i.e., a fixed number of windings per unit length of tube 2, at least along the operative length of the tube 2, i.e., the length of the tube over which measurements are to occur. Alternatively, however, primary coil 10 can be wound with a variable winding density distribution providing the signals received by one or more secondary coils, described hereinafter in greater detail, are processed in a suitable manner to account for such variable winding density distribution in the primary coil 10. The primary coil 10 is preferably excited by a sinusoidal oscillating current supplied by control system 16 shown in FIG. 1. In response to such excitation, the primary coil 10 produces an oscillating electromagnetic field in and around the tube 2. Primary coil 10 can, alternatively, be excited by other excitation waveforms, such as, without limitation, a square wave, but at a lower efficiency than the sinusoidal current.

The first secondary coil 12 is wound concentric with the primary coil 10 and at a density that, preferably, varies periodically along the longitudinal axis $T_A$ of the tube 2. In the illustrated embodiment, the winding density distribution of the first secondary coil 12 is repeated a plurality of cycles between the ends of the primary coil 10. Alternatively, a single cycle of the winding density distribution of the secondary coil 12 can be utilized with relatively short tubes for accurate detection of the position of float 4''' or with relatively long tubes for approximate detection of the position of float 4'''.

The winding density distribution of the first secondary coil 12 preferably varies as a sine function according to the equation:

$$E_Q(1): \text{Winding Density Distribution} = a \sin bx.$$

Alternatively, however, the winding density distribution can vary as another periodic function, such as, without limitation, a step or square function.

The winding direction of the first secondary coil 12 changes from clockwise winding to counterclockwise winding or vice versa, i.e., the coil is counter wound, at points along the length of tube 2 where the density of the coil equals zero. Preferably, the winding density distribution varies in accordance with equation 1 above and the coil arrangement is balanced, i.e., the number of clockwise windings equals the number of counterclockwise windings. In FIG. 4, the points where the coil density of the first secondary coil 12 are zero are identified as $\alpha$, $\beta$, $\gamma$, $\delta$ and $\epsilon$.

The signals induced in the windings of the first secondary coil 12 change periodically as a function of the excitation of the primary coil 10 and the axial position of float 4" in the tube 2. More specifically, the windings of the first secondary coil 12 that experience the greatest change in the magnetic flux are those windings closely adjacent float 4".

Alternatively, the first secondary coil 12 is wound in one direction only, e.g., clockwise, with periodic changing of the winding density. Winding first secondary coil 12 in this manner, however, results in first secondary coil 12 producing for a given intensity of electromagnetic field, additional unwanted signal components that must be accounted for when the signal produced by first secondary coil 12 is processed by the control system 16. Accordingly, a balanced coil arrangement is preferred.

The second secondary coil 14 is identical to the first secondary coil 12. The winding density distribution of the second secondary coil 14, however, is shifted with respect to the winding density distribution of the first secondary coil 12 by a part of a cycle of the winding density distribution or phase angle $\Phi$. Preferably, this phase angle $\Phi$ is equal to one-quarter of the cycle of the winding density distribution for purposes of processing the signals produced by the first and second secondary coils 12 and 14. The points where the winding density distribution of the second secondary coil 14 are zero are identified in FIG. 4 as $\alpha'$, $\beta'$, $\gamma'$, $\delta'$ and $\epsilon'$.

Referring back to FIG. 2, in operation, primary coil 10 is preferably driven by a sinusoidally varying signal. The sinusoidally varying signal in primary coil 10 produces a sinusoidally varying electromagnetic field in the ferromagnetic core 18 of float 4'. In response to the improved magnetic permeability of ferromagnetic core 18 in float 4', a locally intense electromagnetic field is produced in and around tube 2 adjacent float 4'. This locally intense electromagnetic field produces in secondary coils 12 and 14 signals that have a phase and amplitude that can be translated into a sine function and a cosine function, respectively. The ability to translate the signals in secondary coils 12 and 14 into a sine and cosine function, respectively, is occasioned by the shift of one-quarter of the cycle of the winding density distribution between the first and second secondary coils 12 and 14. These sine and cosine or quadrature signals can be analyzed in a manner known in the art to determine the position of float 4' in the tube 2 within one cycle of the winding density distribution of first and second secondary coils 12 and 14.

Any periodically varying signal in primary coil 10 can be utilized to excite signals in the first and second secondary coils 12 and 14. However, a sinusoidally varying signal is the simplest to translate to position information while allowing for compensation in variations of the excitation voltage coupling efficiency.

When wound in the above-described manner, first and second secondary coils 12 and 14 allow for the position of float 4' to be determined within one cycle of the winding density distribution of first and second secondary coils 12 and 14. Moreover, if the position of float 4' is continuously monitored by the control systems 16, the absolute position of float 4' in tube 2 can be determined. However, if the power to the control system 16 is removed and thereafter reapplied, the absolute position of float 4' in tube 2 cannot be determined utilizing first and second secondary coils 12 and 14 exclusively. Accordingly, it is preferable to provide a third position signal to the control system 16 having a resolution of at least one-quarter of the cycle length of the first and second secondary coils 12 and 14. This third signal is provided by a third secondary coil 40 with a winding density distribution that varies linearly according to the equation:

$$E_Q(2): \text{Coil Density} = Ax + B$$

i.e., as a function of the position of the coil along the length of tube 2.

With reference back to FIG. 4, the coil winding direction of the third secondary coil 40 changes from a clockwise winding direction to a counterclockwise winding direction where the coil density equals zero, designated as σ in FIG. 4. Preferably, the coil winding density equals zero intermediate the ends of the third secondary coil 40. By winding the third secondary coil 40 in this manner, the signal produced by the third secondary coil 40 varies monotonically along the length of the third secondary coil 40. Utilizing the third secondary coil 40, the approximate position of float 4''' along the length of tube 2 can be determined independent of the first and second secondary coils 12 and 14. The first and second secondary coils 12 and 14 are then utilized to detect the position of the float 4''' in tube 2 within one cycle of the winding density distribution of the first and second secondary coils 12 and 14.

Figure 5:
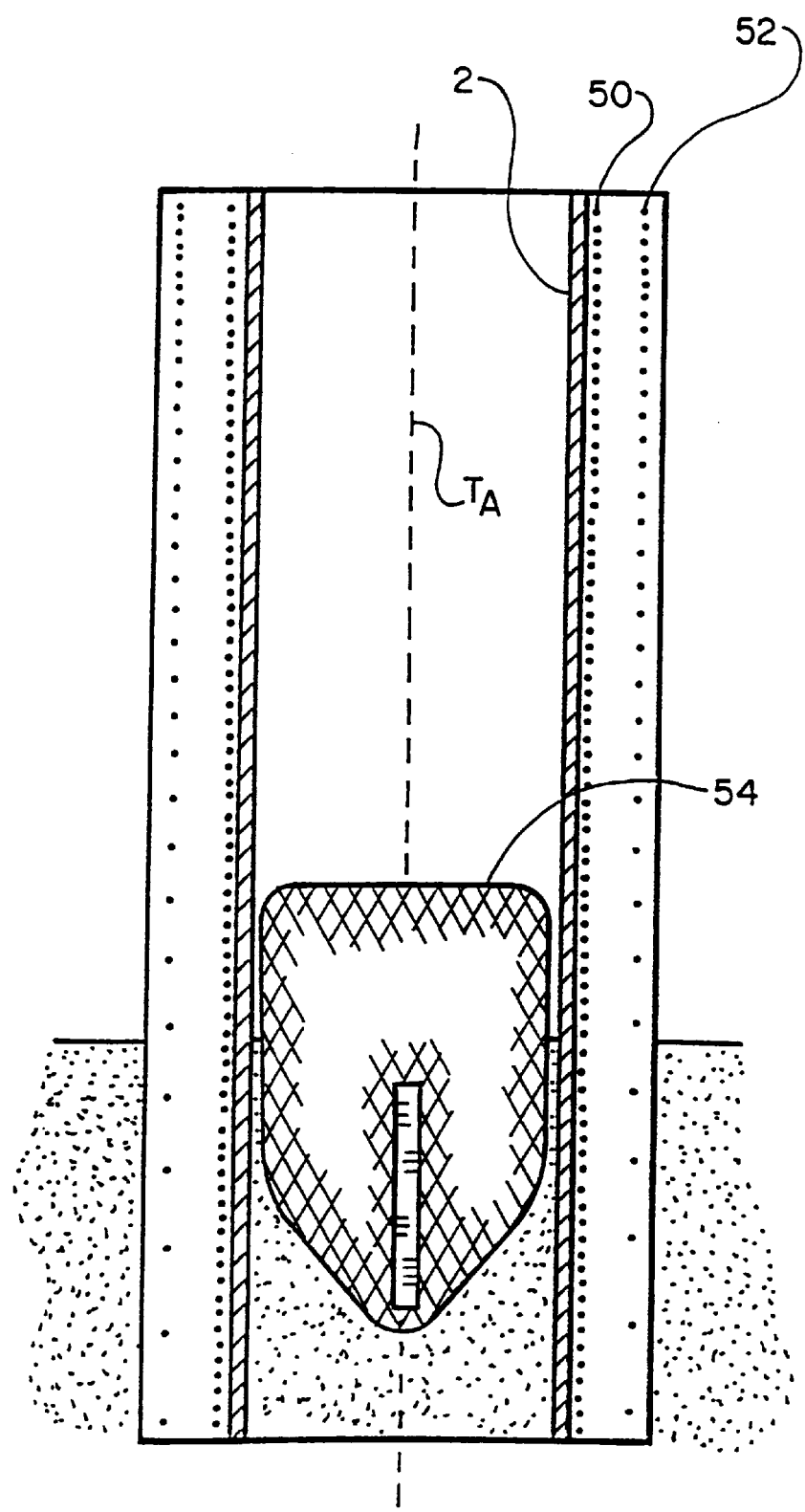
FIG. 5 is a sectional side elevational view of a portion of the sensor system in accordance with the present invention including a tube having a primary coil, a monotonically varying secondary coil and a float, including a ferromagnetic core positioned in the float.

With reference to FIG. 5, one primary coil 50 and one secondary coil 52 are wound around tube 2. The secondary coil 52 has a winding density distribution that varies monotonically and can be utilized to detect the position of the float 54. Generally, a secondary coil with a large winding density distribution produces a greater signal than a secondary coil with a small winding density distribution for a given intensity of magnetic flux passing therethrough. Thus, by detecting the amplitude of the signal produced by the one secondary coil 52, the approximate position of the float 54 can be determined in the absence of additional secondary coils.

With reference back to FIG. 4, to increase the resolution of the sensor to detect changes in the position of the float 4''' relative to the tube 2, however, it is necessary to provide additional secondary coils, e.g., first and second secondary coils 12 and 14, having a plurality of cycles of winding density distribution that are shifted with respect to each other as illustrated in, for example, FIG. 4. To improve the resolution of the sensor to detect changes in the position of float 4''', the length of each cycle of the winding density distribution is decreased. Similarly, increasing the length of each cycle of the winding density distribution decreases the resolution of the sensor. By providing secondary coils of various combinations of winding density distribution, cycle lengths, phase angle Φ, and the like, a sensor of desired length and resolution can be obtained.

With reference back to any one of FIGS. 2–4, the winding density distribution of the first secondary coil 12 and the second secondary coil 14 can, alternatively, be modified so that a combination of the signals produced by the first and second secondary coils 12 and 14 varies monotonically along the length of the primary coil 10 thereby avoiding the need for additional secondary coils. One such combination of signals by first and second secondary coils 12 and 14 includes the sum of the squares of the signals generated by these coils.

The winding density distribution of the primary coil 10 can also be wound at other than a constant winding density with corresponding adjustment of the manner in which the signals produced by first and second secondary coils 12 and 14 are processed. Modifying the winding density distribution of the primary coil 10 or of the first and second secondary coils 12 and 14, however, may not provide sufficient resolution for tubes 2 having longer lengths. To increase the resolution in applications having long tubes 2, in addition to first and second secondary coils 12 and 14, one or more additional secondary coils of different winding density distribution and/or cycle lengths can be added to the tube 2. In this manner, large movements of a float can be measured with high accuracy, e.g., better than one percent of the length of the cycle of the one or more additional coils, without the need for high stability electronic circuits or high resolution data acquisition systems.

The order of winding the primary and secondary coils 10, 12, 14, etc., on the tube 2 is arbitrary and does not affect the operation or performance of the sensor system A. Moreover, any one of the primary and secondary coils 10, 12, 14, etc., can be used as a primary coil because inductive coupling between coils is bi-directional. Accordingly, the role of the primary coil 10 and one of the first and second secondary coils 12 and 14 can be reversed providing one of the coils produces a time varying electromagnetic field and the other coil(s) receive(s) the same.

Figure 6:
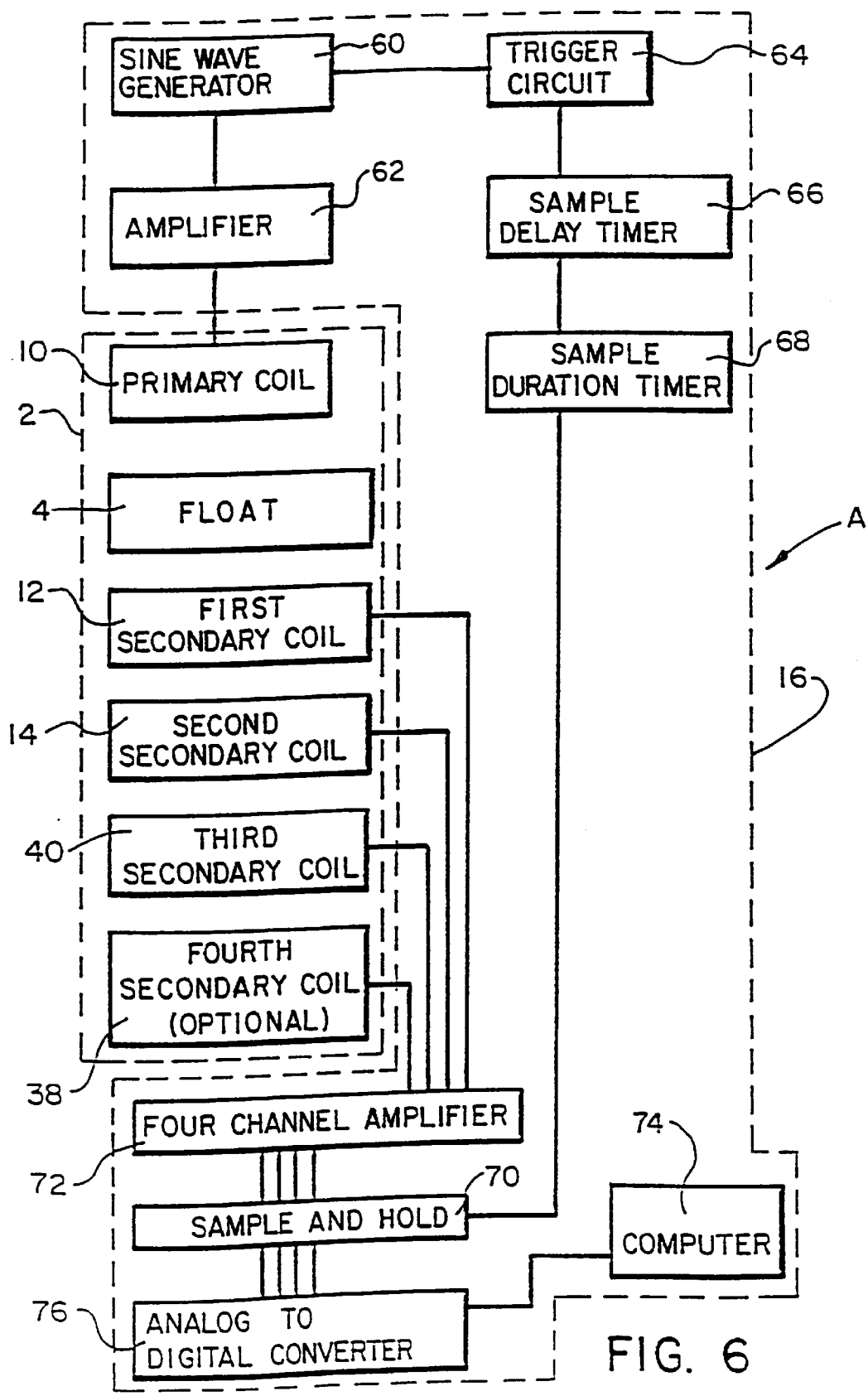
FIG. 6 is a block diagram of a control system for exciting a primary coil of the sensor system and for receiving signals from secondary coils of the sensor system.

With reference to FIG. 6, and with continuing reference to FIGS. 2–4, the control system 16 for exciting the primary winding 10 and receiving signals from the secondary coils includes a signal or sine wave generator 60 providing an output to an amplifier 62 and a trigger circuit 64. The amplifier 62 amplifies the output of the sine wave generator 60 and provides the amplified signal to the primary coil 10. In response to the output of the sine wave generator 60, trigger circuit 64 provides a trigger signal to a sample delay timer 66. The sample delay timer 66 delays the sampling of the output of the first, second and third secondary coils 12, 14 and 40 for a predetermined delay interval. After the predetermined delay interval, sample delay timer 66 provides a signal to sample duration timer 68. In response to the output signal of sample delay timer 66, sample duration timer 68 outputs a signal to a sample and hold 70 for a predetermined interval. During the interval, the sample duration timer 68 outputs a signal, sample and hold 70 samples the output of a four channel amplifier 72, which receives the output of the first, second and third secondary coils 12, 14 and 40 of tube 2. After termination of the output signal by the sample duration timer 68, a computer 74 samples the outputs of the sample and hold 70 via an analog to digital converter 76. Alternatively, the fourth channel of four channel amplifier 72 is utilized to amplify the output of an optional fourth secondary coil 38 wound on tube 2. The features and use of the fourth secondary coil 38 will be described hereinafter in connection with FIG. 9.

With reference to FIGS. 2 and 6, a test sensor system, constructed in accordance with the present invention, includes a plastic tube having a length of 1.5 meters and an internal diameter of 40 mm. The primary coil 10 was wound with a constant winding density around 1264 mm of the length of tube 2 in the manner illustrated in FIG. 2. The first and second secondary coils 12 and 14 were counter wound around the tube 2 in a manner wherein the cycle of the winding density distribution of each of the secondary coils is 158 mm and the winding direction changes every 79 mm. The axial length of the ferromagnetic core 18 is float 4''' is 67 mm. The first and second secondary coils 12 and 14 are wound in a manner whereby their respective coil winding density distribution are defined by alternating step functions shifted by a quarter of a cycle. The third secondary coil 40 is wound with a winding density that varies linearly in accordance with equation 2. The first, second and third secondary coils 12, 14 and 40 are wound with the same length as the primary coil, i.e., 1264 mm.

In operation, the float 4' is positioned inside tube 2 and primary coil 10 is driven by signal generator 60 via amplifier 62. In response to excitation by primary coil 10, the ferromagnetic core 18 of float 4' produces a locally intense electromagnetic field that is sensed by the windings of first, second and third secondary coils 12, 14 and 40, which are closely adjacent float 4'. In response to sensing the locally intense electromagnetic fields, the secondary coils produce signals that are detectable by the control system 16. The signals produced by the secondary coils are supplied to amplifier 72 which receives the supplied signals and amplifies the same. Amplifier 72 supplies the amplified signals to the sample and hold 70. The output of sample and hold 70 is provided to the analog to digital converter 76 which converts the analog output of the sample and hold 70 to a digital equivalent. The output of the analog to digital converter 76 is suppled to the computer 74. The signal's output by the sample and hold 70 is individually analyzed by computer 74 to obtain the position of the float 4' to within one cycle of the winding density distribution of the first and second secondary coils 12 and 14. The computer 74 also evaluates the analog to digital converted signal from the third secondary coil 40 to obtain the approximate position of the float 4' along the length of the tube 2. Any non-linearities in the signal within the cycle caused by deviations of the winding density distribution from the preferred sine/cosine combination is compensated for numerically by a program in the computer 74. The above-described test sensor system has a resolution and repeatability of measurements within 1 mm.

Figure 7:
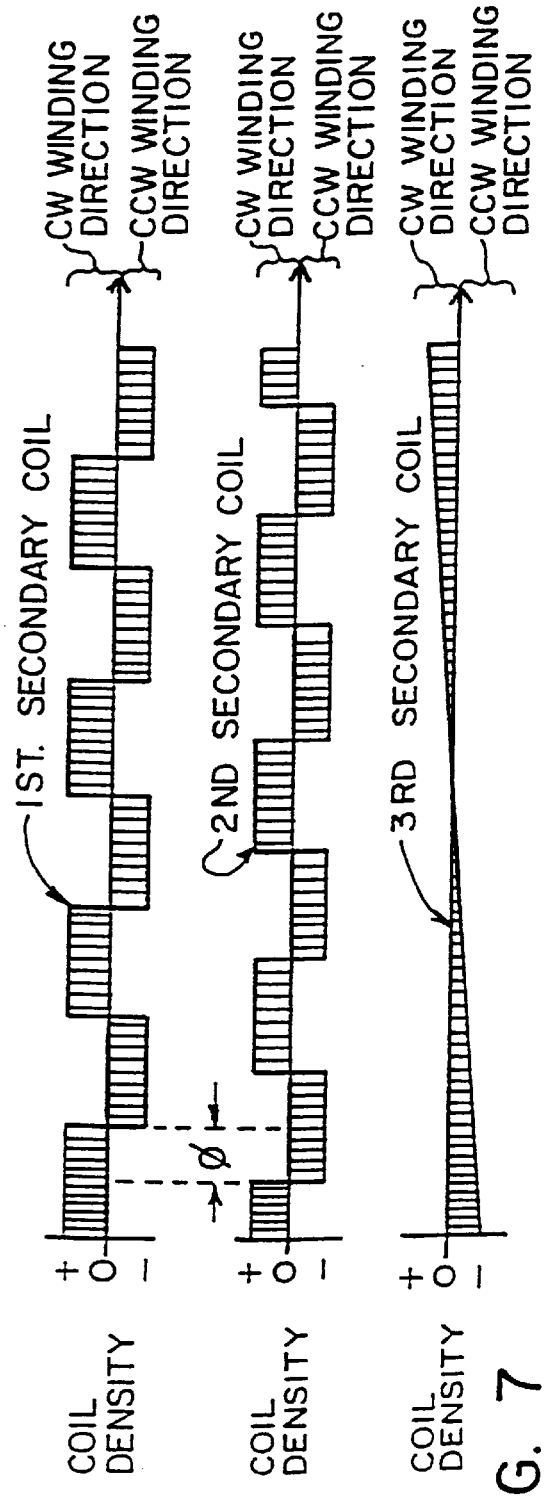
FIG. 7 is a graph illustrating the winding density distributions including winding direction of a first and second secondary coil in accordance with an alternating step function and a third secondary coil having a linearly varying winding density distribution.

With reference to FIG. 7, in another test sensor system, the winding density distribution of the first and second secondary coils 12 and 14 is defined by alternating step functions shifted by one-quarter of a cycle of the winding density distribution. In this test sensor system, however, the winding density distribution of the first and second secondary coils 12 and 14 is repeated four cycles and each cycle has a length of approximately 90 mm. The plastic tube 2 in this prototype has an inside diameter of 20 mm. A third secondary coil 40 was wound with a winding density that varies linearly in accordance with equation 2. Thus, the coil density of the third secondary coil equals zero intermediate the ends of the third secondary coil 40. Like the prior test sensors system, the first, second and third secondary coils 12, 14 and 40 are connected to supply a signal to amplifier 72. The amplifier 72 amplifies the signals supplied by the secondary coils and supplies the amplified signals to sample and hold 70. At select intervals, the sample and hold 70 is caused to sample the outputs of amplifier 72 and supply the sampled outputs to analog to digital converter 76. At select intervals, computer 74 samples the output of analog to digital converter 76 to obtain the analog to digital converted outputs of sample and hold 70 for each of the secondary coils. If additional resolution and/or a longer sensor is needed, then additional secondary coils, e.g., fourth secondary coil 38 in FIG. 9, can be included on tube 2 and can have cycles of winding density distributions sufficient in length to provide a desired amount of position resolution.

Figure 8:
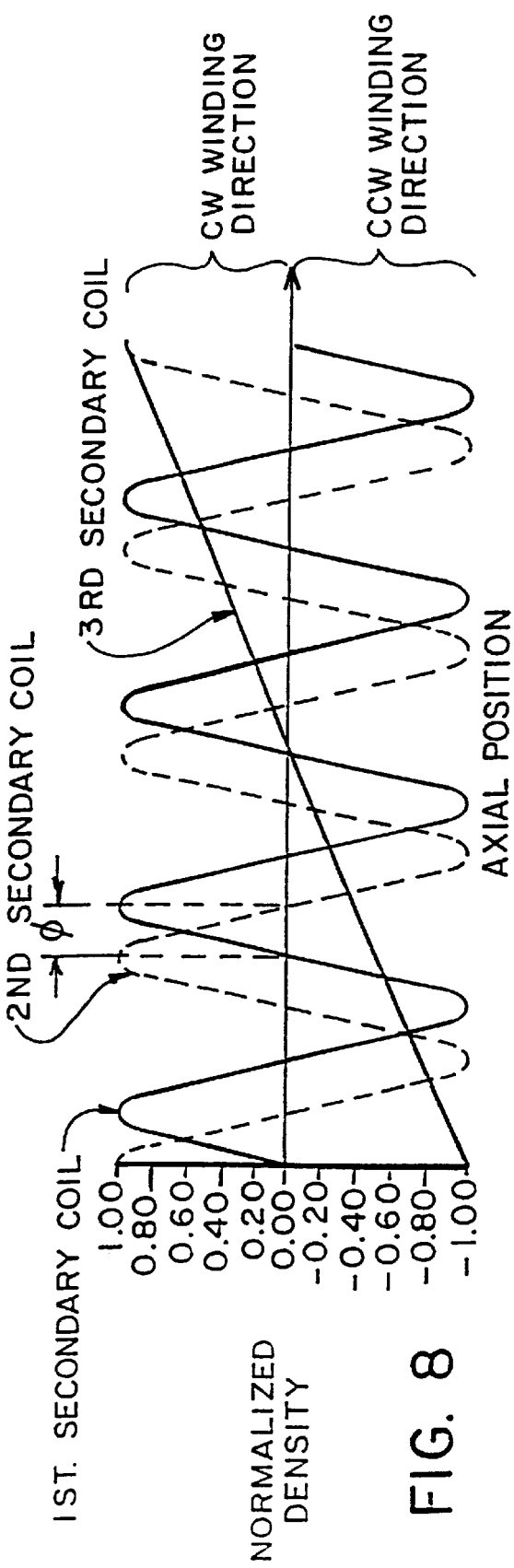
FIG. 8 is a graph illustrating the coil winding density distribution including winding direction of a first and second secondary coil in accordance with a sine and cosine function and a third secondary coil in accordance with a linearly varying function.

With reference to FIG. 8, alternatively, the winding density distribution of the first and second secondary coils 12 and 14 is defined by a sine function and a cosine function, respectively, and the winding density distribution of the third secondary coil 40 varies linearly. The coil winding direction of the secondary coils changes each time the winding density distribution equals zero.

Signals from the first and second secondary coils 12 and 14 can be processed in two methods. In the one method, the change in voltage in each of the first and second secondary coils 12 and 14 during a fixed phase of the oscillation of the excitation voltage is determined and utilized to determine the position of float 4' in tube 2. In this method, the phase shift $\Phi$ between the first and second secondary coils 12 and 14, is preferably one-quarter of the cycle of the winding density distribution. This one-quarter of a cycle phase shift $\Phi$ establishes a quadrature relationship between the first and second secondary coils 12 and 14 whereby the first and second quadrature signals are produced thereby. If the winding density distribution of the quadrature coils varies sinusoidally, then variations in the excitation amplitude and coupling efficiency can be determined numerically by computer 74 thereby reducing errors in the measured displacement of the float 4' in the tube 2.

In the other signal processing method, the amplitude of oscillations in the first and second secondary coils 12 and 14 is measured. In this method, the shift between the first and second secondary coils 12 and 14 is one-eighth of a winding cycle. This is so because there are two amplitude cycles for every phase cycle. The circuitry of control system 16 for analyzing the signals in this latter method is similar, however, the circuitry is more sensitive to variations in the excitation amplitude and the coupling efficiency.

Figure 9:
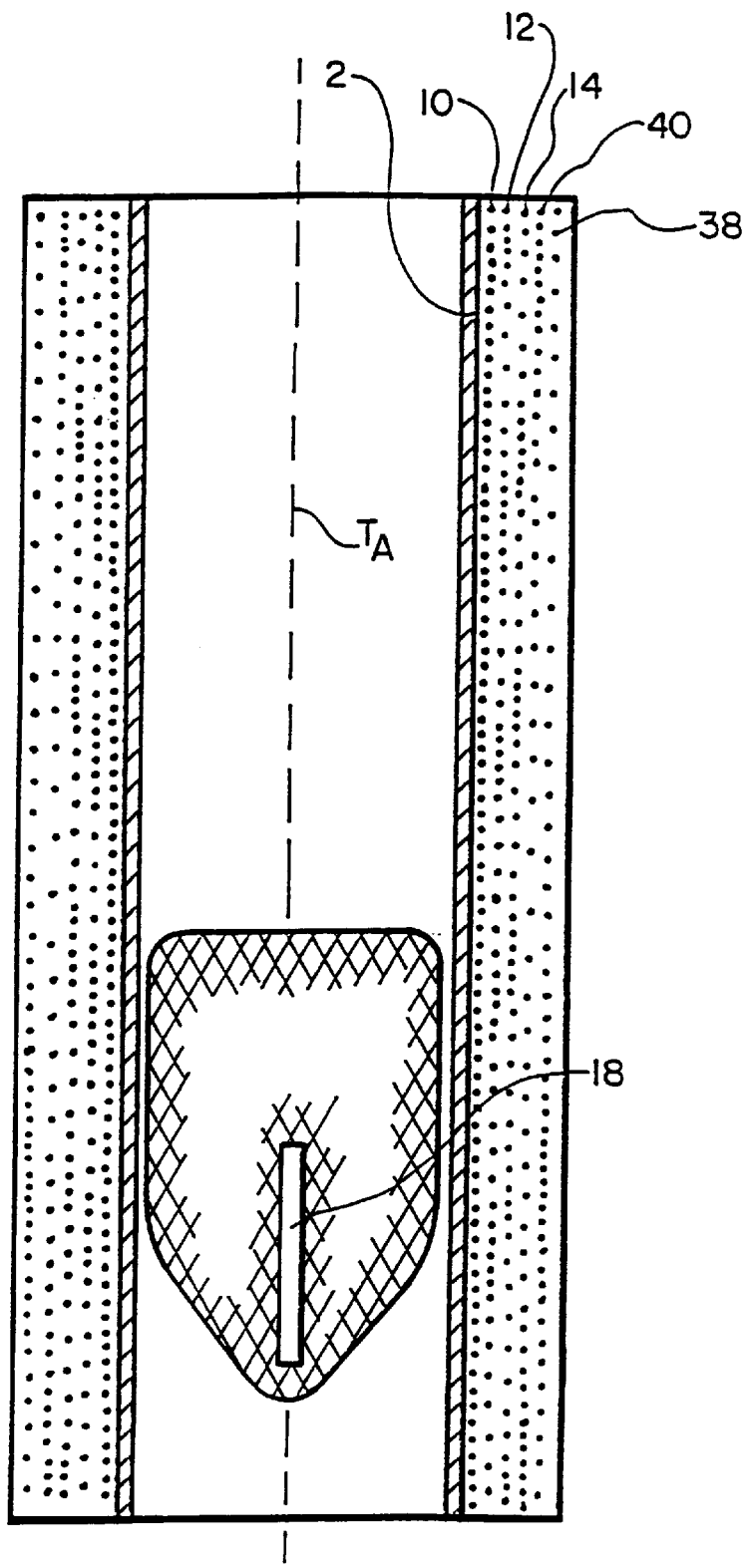
FIG. 9 is a sectional side elevational view of a portion of a fluid level sensor in accordance with the present invention including a primary coil, four secondary coils and a float that has a ferromagnetic core therein.

With reference to FIG. 9, a fourth secondary coil 38 is wound around tube 2. The winding density distribution of the fourth secondary coil 38 varies linearly and is shifted with respect to the winding density distribution of the third secondary coil 40. Preferably, the shift is equal to one-quarter of a cycle of the winding density distribution. In an embodiment of this type wherein the primary coil 10 was wound with a constant winding density distribution, the first and second secondary coils 12 and 14 were wound twenty cycles of the winding density distribution thereof, the third and fourth secondary coils 40 and 38 were wound with one cycle of the winding density distribution, thereof, a resolution of $\frac{1}{4000}$ was obtained.

Figure 10:
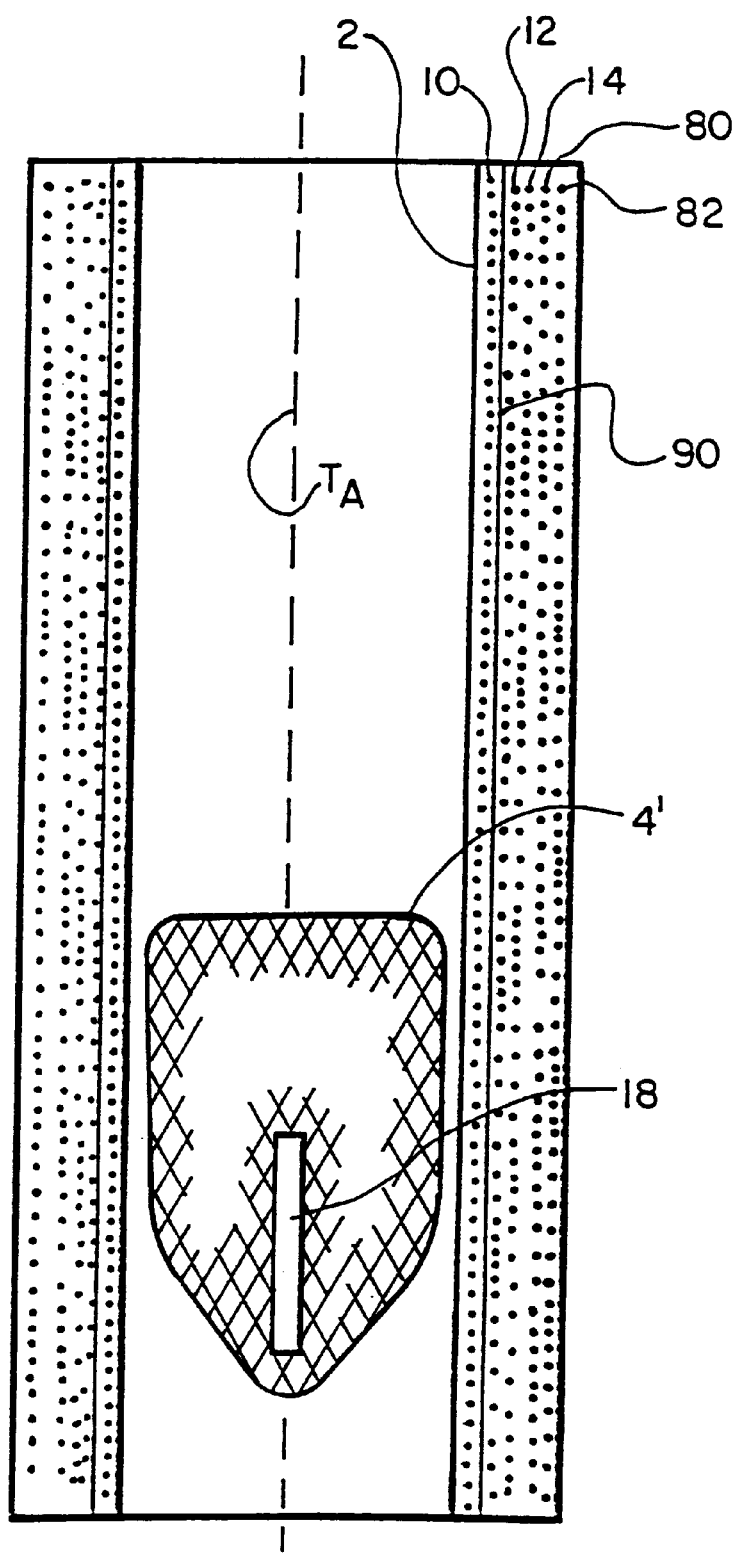
FIG. 10 is a sectional side elevational view of a portion of a fluid level sensor in accordance with the present invention including a primary coil, four secondary coils, a shield between the primary coil and secondary coils and a float that has a ferromagnetic core therein.

With reference to FIG. 10, the primary coil 10 is wound with a constant winding density distribution, the first and second secondary coils 12 and 14 are wound with a sinusoidally varying winding density distribution and the first and second secondary coils 12 and 14 are shifted by part of a cycle of the winding density distribution, preferably one-quarter of a cycle. The first and second secondary coils 12 and 14 are wound with N cycles of winding density distributions over the length of the tube 2. Moreover, a third secondary coil 80 and a fourth secondary coil 82 are wound relative to each other in a manner similar to first and second secondary coils 12 and 14, i.e., the third and fourth secondary coils 40 and 42 are shifted one-quarter cycle with respect to each other. However, the third and fourth secondary coils 80 and 82 are wound with N+1 cycles of winding density distributions over the length of tube 2.

To determine the position of float 4' in this embodiment, the position of float 4' within a cycle of the winding density distribution of the first and second secondary coils 12 and 14 is determined and the position of float 4' within a cycle of the winding density distribution of the third and fourth secondary coils 80 and 82 is determined. Because there is no overlap in the winding density distributions between the first pair of secondary coils 12 and 14 and the second pair of secondary coils 80 and 82, the position of the float can be determined by comparing the relative position information of the first pair of secondary coils 12 and 14 with the relative position information of the second pair of secondary coils 80 and 82. Stated differently, the combination of the quadrature signals of the first pair of secondary coils and the second pair of secondary coils is unique for every position of the float 4' over the length of the tube 2. Accordingly, the position of float 4' in the tube 2 can be determined from the quadrature signals to within one-half of one percent of the length of the shorter of the cycle windings, i.e., N+1 cycle windings. Error averaging can be utilized to further improve the accuracy of the sensor system. An advantage of this latter embodiment is that the measurement of the position of the float 4' is independent of the total length of one or more of the secondary coils, e.g., first and second secondary coils 12 and 14. This is particularly advantageous in applications where ferromagnetic material settles around one end of the tube 2 whereby the detection capability of a linearly varying coil would be affected by the magnetic particles. Alternatively, the first and second secondary coils 12 and 14 are wound with N cycles of winding density distributions and the third and fourth secondary coils 80 and 82 are wound with M winding density distributions, wherein N and M are mutually prime numbers that do not have a denominator in common other than the number one.

Preferably, the secondary coils have balanced windings, i.e., the number of windings in a positive direction equals the number of windings in a negative direction. Moreover, shielding 90, such as aluminum foil or wound coils, is alternatively provided between the primary coil and the secondary coils and/or between secondary coils. This shielding improves the signal output by the secondary coils by reducing the level of noise on the electromagnetic fields received by the secondary coils. When formed from wound coils, the shielding 90 can be counter wound between the ends of the tube 2. While described in conjunction with measuring fluid levels, the present invention also finds applications in replacement of LVDTs. Moreover, the choice of a doughnut-shaped float of FIG. 4 versus the piston-shaped float of FIG. 2 is application dependent. Specifically, for measuring the level of dirty fluids, a doughnut-shaped float is preferred because the gap between the float and the tube is more readily cleanable than the gap between the piston-shaped float and the inside of the tube.

With reference back to FIG. 1, since an LC resonator can be used in float 4, multiple floats with LC circuits tuned to different frequencies can be used to detect, for example, levels of water and oil in the same tank. Thus, one float 4 can be used to measure the level of oil on water while another float 5 shown in phantom in FIG. 1 can be used to measure the level of the water. The excitation frequency of primary coil 10 in FIG. 4 would be changed between readings in order to stimulate the proper float.

Figure 11A:
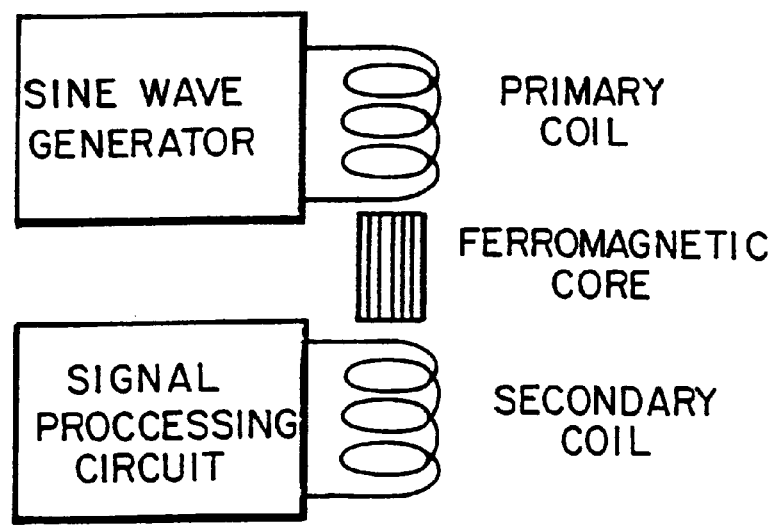
FIGS. 11a and 11b are schematic representations of two manners of magnetically coupling the primary coil and the secondary coil.
Figure 11B:
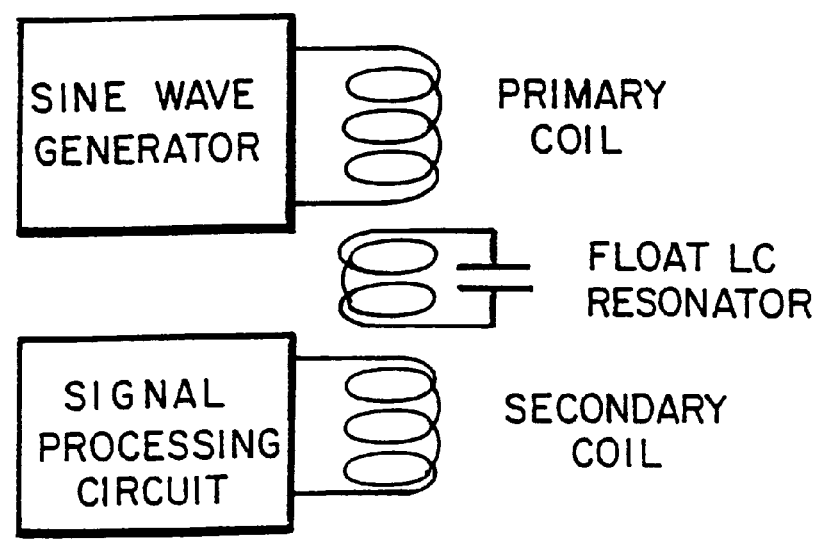

With reference to FIG. 11a, the primary coil 10 is magnetically linked to one or more of the secondary coils via the ferromagnetic core. With reference to FIG. 11b, the primary coil is magnetically linked to the secondary coil via the float containing the LC resonator. The diagrams in FIGS. 11a and 11b illustrate two ways of magnetically coupling the primary coil and the secondary coils.

Figure 12:
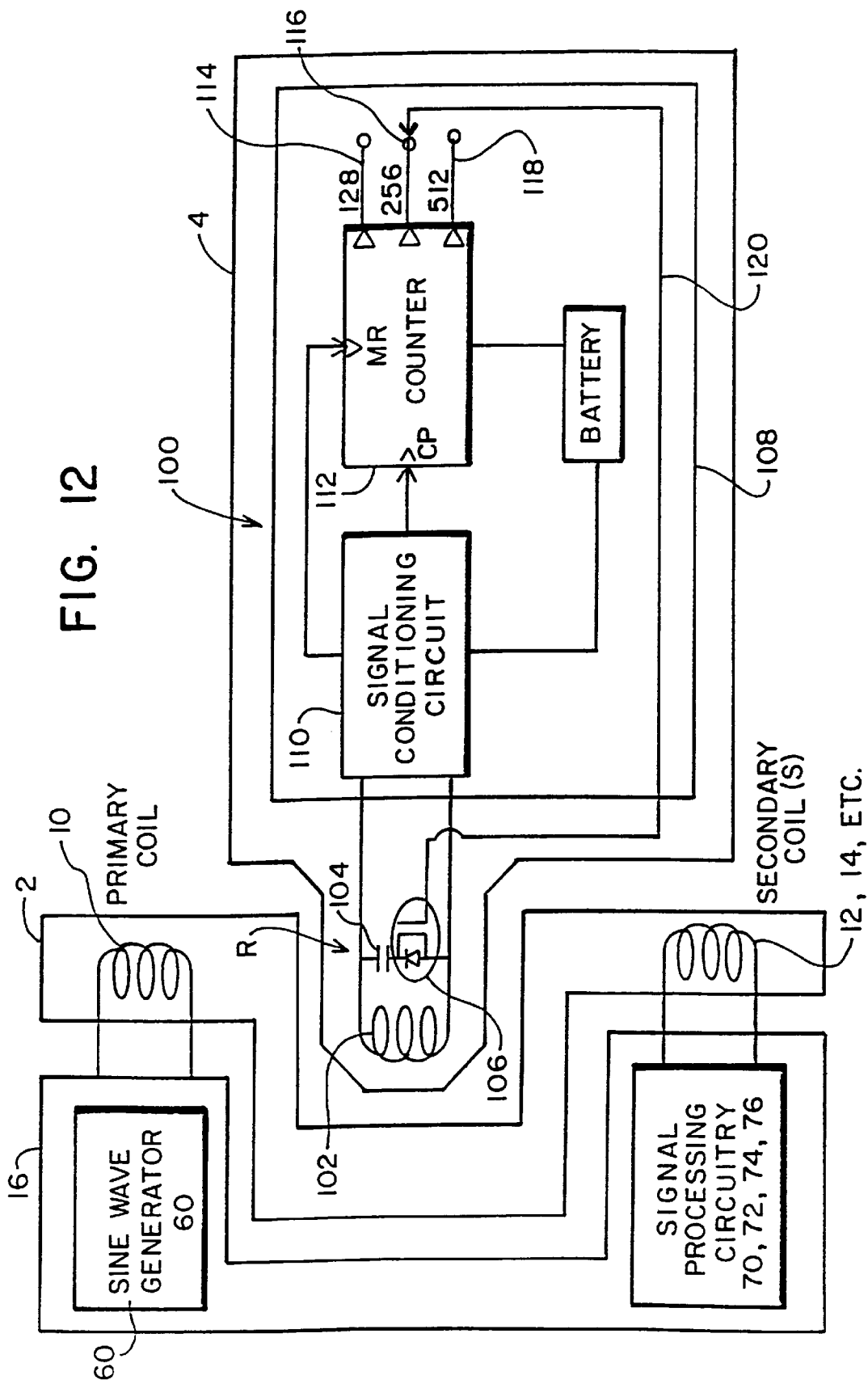
FIG. 12 is a schematic representation of magnetic coupling between the primary coil, the secondary coils and a float having a resonating circuit made in accordance with the present invention.

With reference to FIG. 12 and with reference back to FIG. 6 in another embodiment, the float 4 can include an LC resonator 100. The LC resonator 100 includes a resonator coil 102 connected in parallel to a series connected capacitor 104 and switch 106, such as an FET. The resonator coil 102 and the capacitor 104 form a resonating circuit R which is active when the switch 106 is closed and which is inactive when the switch 106 is open. A switch control circuit 108 includes a signal conditioning circuit 110 connected to the resonator coil 102. The signal conditioning circuit 110 amplifies signals generated by the resonator coil 102 and supplies the amplified signals to a CP input of a counter 112. The signal conditioning circuit 110 also generates a reset signal which is coupled to an MR input of the counter 112. The reset signal causes registers within the counter 112 to reset.

In operation, the sine wave generator 60 of the control system 16 excites the primary coil 10 of the tube 2 with a time varying signal at a first frequency, preferably 1.2 kHz. In response, the primary coil 10 produces a time varying electromagnetic field which causes the resonator coil 102 to generate a signal at the first frequency. The first frequency preferably corresponds to the resonating frequency of the resonating circuit R. The signal conditioning circuit 110 amplifies the signal generated by the resonator coil 102 and provides the amplified signal to the CP input of the counter 112. When the resonator coil 102 initially generates the signal at the first frequency, the signal conditioning circuit 110 terminates the reset signal to the MR input of the counter 112 thereby enabling the counter 112 to count each cycle of the amplified signal received at the CP input.

The counter 112 includes a plurality of outputs each of which changes state in response to the CP input of the counter 112 receiving a predetermined number of cycles of the amplified signal from the signal conditioning circuit 110. Specifically, the counter 112 has a first output 114 that changes state when the CP input receives 128 cycles of the amplified signal. The counter 112 also has second and third outputs 116, 118 which change state in response to the CP input receiving 256 and 512 cycles of the amplified signal, respectively. The counter 112 can include other outputs corresponding to the CP input receiving a predetermined number of counts associated therewith.

In the embodiment shown in FIG. 12, the second output 116, is connected to a switch control lead 120 which is connected to control the on/off operation of the switch 106. In response to the CP input receiving 256 cycles of the amplified signal from the signal conditioning circuit 110, the second output 116 of the counter 112 changes state thereby causing switch 106 to close, or conduct, and activate the resonating circuit R.

Cycles 0–255 of the amplified signal correspond to a first interval during which the control system 16 samples a compensation signal from each secondary coil 12, 14, etc. By each secondary coil 12, 14, etc., is meant that the sensor can have one or more of the previously described secondary coils, or others. This compensation signal corresponds to the response of each secondary coil 12, 14, etc., to excitation by the time varying electromagnetic fields produced by the primary coil when the resonating circuit R is inactive. Cycles 256–511 of the amplified signal correspond to a second interval during which the switch 106 is conducting and the resonating circuit R is active. The active resonating circuit R produces at each secondary coil 12, 14, etc., a locally intense time varying electromagnetic field which is detectable by the signal processing circuitry 70, 72, 74, 76 of the control system 16. During the second interval, the control system 16 samples a composite signal from each secondary coil 12, 14, etc. The control system 16 subtracts from the composite signal for each secondary coil 12, 14, etc., the compensation signal thereof to obtain an elemental signal corresponding to the actual response of each secondary coil 12, 14, etc., to the active resonating circuit R.

When the compensation signal and the composite signal have been obtained for each of the one or more secondary coils 12, 14, etc., the sine wave generator 60 terminates exciting the primary coil 10. In response, the signal conditioning circuit 110 terminates supplying amplified signals to the CP input of the counter 112 and provides the reset signal to the MR input of the counter 112. The reset signal causes internal registers of the counter 112 to reset.

Figure 13A:
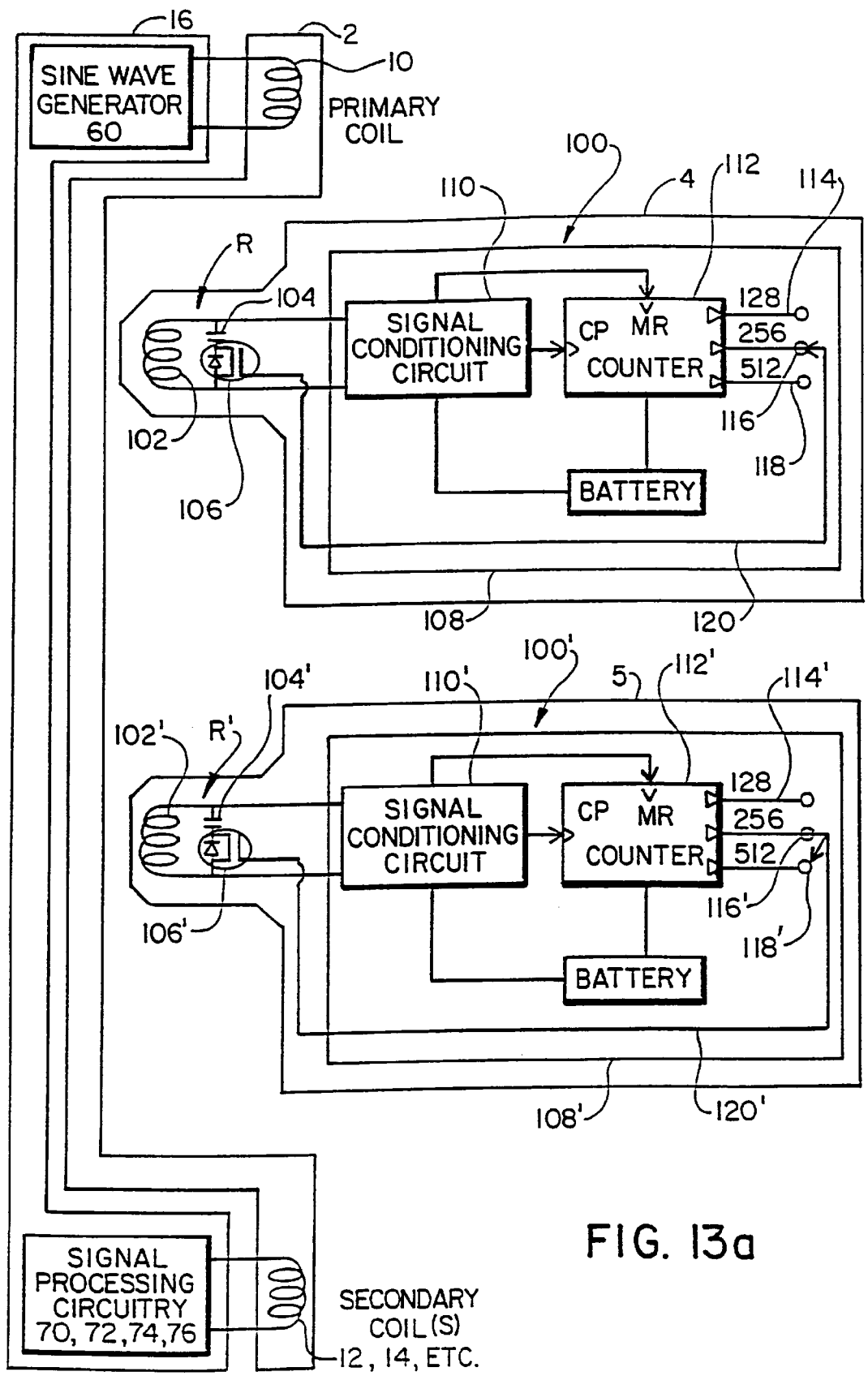
FIG. 13a is a schematic representation of magnetic coupling between the primary coil, the secondary coils and two floats as shown in FIG. 12.

With reference to FIGS. 13a and 13b and with ongoing reference to FIG. 12, since the LC resonator 100 can be used in float 4, multiple floats with switch control circuits 108 tuned to count different numbers of cycles of the excitation frequency can be utilized to detect, for example, levels of water and oil in the same tank. For example, the float 4 described in connection with FIG. 12 can be utilized to detect the level of oil on water and a float 5, similar to float 4, can be utilized to detect the level of the oil. The elements of the float 5 are similar to the elements of the float 4, where like elements are identified by primed numbers.

In operation, the sine wave generator 60 initially excites the primary coil 10 at the first frequency. In response, the counters 112 and 112' of the respective floats 4 and 5 begin counting cycles of the amplified signals provided at the first frequency to the CP inputs thereof. Cycles 0–255 of the first frequency correspond to a first interval 122. During the first interval 122, the second and third outputs 116, 118 of counters 112, 112' connected to the switch control leads 120, 120', respectively, do not change state thereby maintaining switches 106, 106' open. During the first interval 122, the control system 16 samples the compensation signal from each secondary coil 12, 14, etc.

When the sine wave generator 60 has excited the primary coil 10 with 256 cycles at the first frequency, the second output 116 of the counter 112 changes state thereby causing the switch 106 to close and activate the resonating circuit R. Cycles 256–511 of the first frequency correspond to a second interval 124 during which the switch 106 is conducting and the resonating circuit R is active. During the second interval 124, the control system 16 samples a first composite signal from each secondary coil 12, 14, etc. When the sine wave generator 60 excites the primary coil 10 with 512 cycles at the first frequency, the second output 116 of the counter 112 changes state causing switch 106 to open. When switch 106 is open, the resonating circuit R is inactive. Simultaneously, the third output 118' of the counter 112' changes state thereby causing the switch 106' to conduct and activate resonating circuit R' for a third interval 126. During the third interval 126, the control system 16 samples a second composite signal from each secondary coil 12, 14, etc.

When the control system 16 has sampled the second composite signal from each secondary coil 12, 14, etc., the sine wave generator 60 terminates exciting the primary coil 10. In response, the signal conditioning circuits 110, 110' of the floats 4 and 5, respectively, terminate supplying the amplified signals and, after predetermined delay generate reset signals to the MR inputs of the counters 112, 112'.

To detect the response of the secondary coils 12, 14, etc., to the resonating circuit R, the control system 16 subtracts the compensation signal for each secondary coil 12, 14, etc., from the first composite signal thereof to obtain a first elemental signal corresponding to the actual response of each secondary coil 12, 14, etc., to the active resonating circuit R. Similarly, the control system 16 subtracts the compensation signal for each secondary coil 12, 14, etc., from the second composite signal thereof to obtain a second elemental signal corresponding to the actual response of each secondary coil 12, 14, etc., to the active resonating circuit R'. Hence, by subtracting the compensation signal for each secondary coil 12, 14, etc., from the composite signal for each secondary coil 12, 14, etc., the elemental signal response of each secondary coil 12, 14, etc., to the resonating circuits R, R' can be determined.

While described in connection with floats 4 and 5, additional floats can be provided to detect levels of additional different fluids in the tank.

Figure 14:
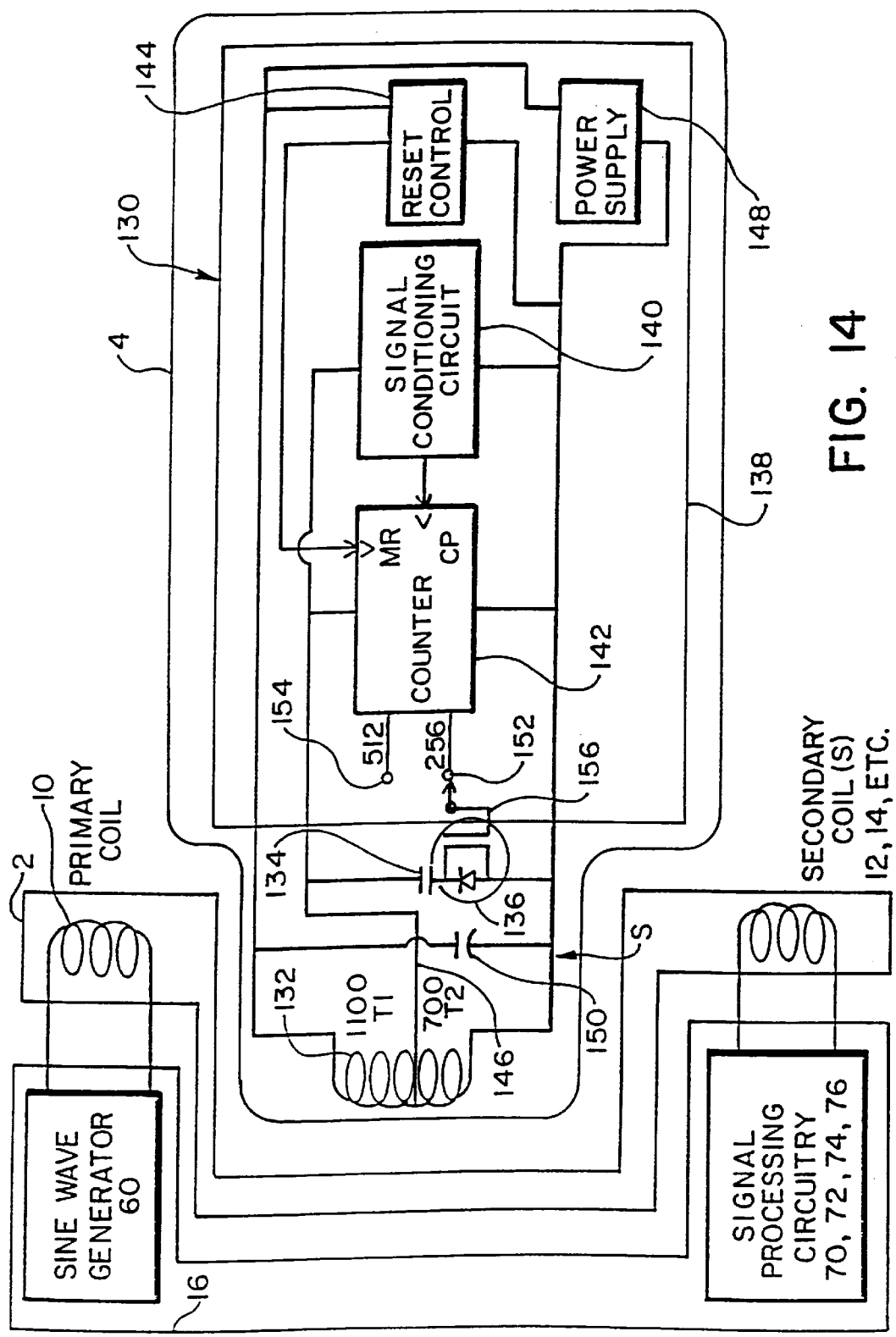
FIG. 14 is a schematic representation of magnetic coupling between the primary coil, the secondary coils and a float having dual resonating circuits made in accordance with the present invention each resonating circuit responsive to a different resonant frequency.

With reference to FIG. 14, another embodiment of float 4 includes an LC resonator 130' having a resonator coil 132, capacitors 133, 134 and a switch 136. A switch control circuit 138 includes a signal conditioning circuit 140 having an output connected to a CP input of a counter 142. A reset control 144 has an output connected to an MR input of the counter 142 for providing a reset signal thereto.

The resonator coil 132 has a tap 146. In a preferred embodiment, the resonator coil 132 includes 1800 turns and the tap 146 separates the resonator coil 132 into a first part T1 having 1100 turns and a second part T2 having 700 turns. All 1800 turns of the resonator coil 132 are connected across the capacitor 133, the reset control 144 and a power supply 148, such as a rechargeable battery and/or a storage capacitor. The second part T2 of the resonator coil 132 is connected to the signal conditioning circuit 140, the counter 142 and the series connected capacitor 134 and switch 136. The second part T2 of the resonator coil 132 and the capacitor 134 form a resonating circuit S that is active when the switch 136 is closed and is inactive when the switch 136 is open.

In operation, the sine wave generator 60 excites the primary coil 10 with a signal having a first frequency, preferably, 3.125 kHz. The resonator coil 132 and the capacitor 133 form a resonator circuit having a resonant frequency corresponding to the first frequency. In response to excitation at the first frequency, the resonator coil 132 and capacitor 133 resonate and generate a signal to the reset control 144 and the power supply 148 at the first frequency. In response to the signal generated by the resonator coil 132 and the capacitor 133 at the first frequency, the reset control 144 generates a reset signal to the MR input of the counter 142. Simultaneously, components (not shown) of the power supply 148 are charged. The sine wave generator 60 excites the primary coil 10 with the signal at the first frequency for a first interval sufficient to cause the reset control 144 to reset the counter 142 and to charge the components of the power supply 148.

After the first interval, the sine wave generator 60 excites the primary coil 10 with a signal having a second frequency, preferably, 1.2 kHz. In response to excitation of the primary coil 10 at the second frequency, the second part T2 of the resonator coil 132 generates a signal to the signal conditioning circuit 140 and the counter 142 at the second frequency. The second frequency preferably corresponds to the resonating frequency of the resonating circuit S. In response to receiving the signal generated by the second part T2 of the resonator coil 132, the signal conditioning circuit 140 amplifies the signal and provides the amplified signal to a CP input of the counter 142. The counter 142 counts each cycle of the amplified signal received at the CP input. Cycles 0–255 of the second frequency correspond to a second interval wherein a first output 152 of the counter 142 is in a state whereby the switch 136 connected to the first output 152 by a switch control lead 156 remains open and the resonating circuit S is inactive. During cycle 256 of the second frequency, the first output 152 changes state causing the switch 136 to conduct thereby activating the resonating circuit S. During the second interval, the control system 16 samples from each secondary coil 12, 14, etc., a compensation signal. Cycles 256–511 of the second frequency correspond to a third interval wherein the resonating circuit S is active. During the third interval, the control system 16 samples from each secondary coil 12, 14, etc., a composite signal. To detect the response of each secondary coil 12, 14, etc., to the resonating circuit S, the control system 16 subtracts the compensation signal for each secondary coil 12, 14, etc., from the composite signal thereof to obtain an elemental signal corresponding to the actual response of each secondary coil to the resonating circuit S.

Figure 15A:
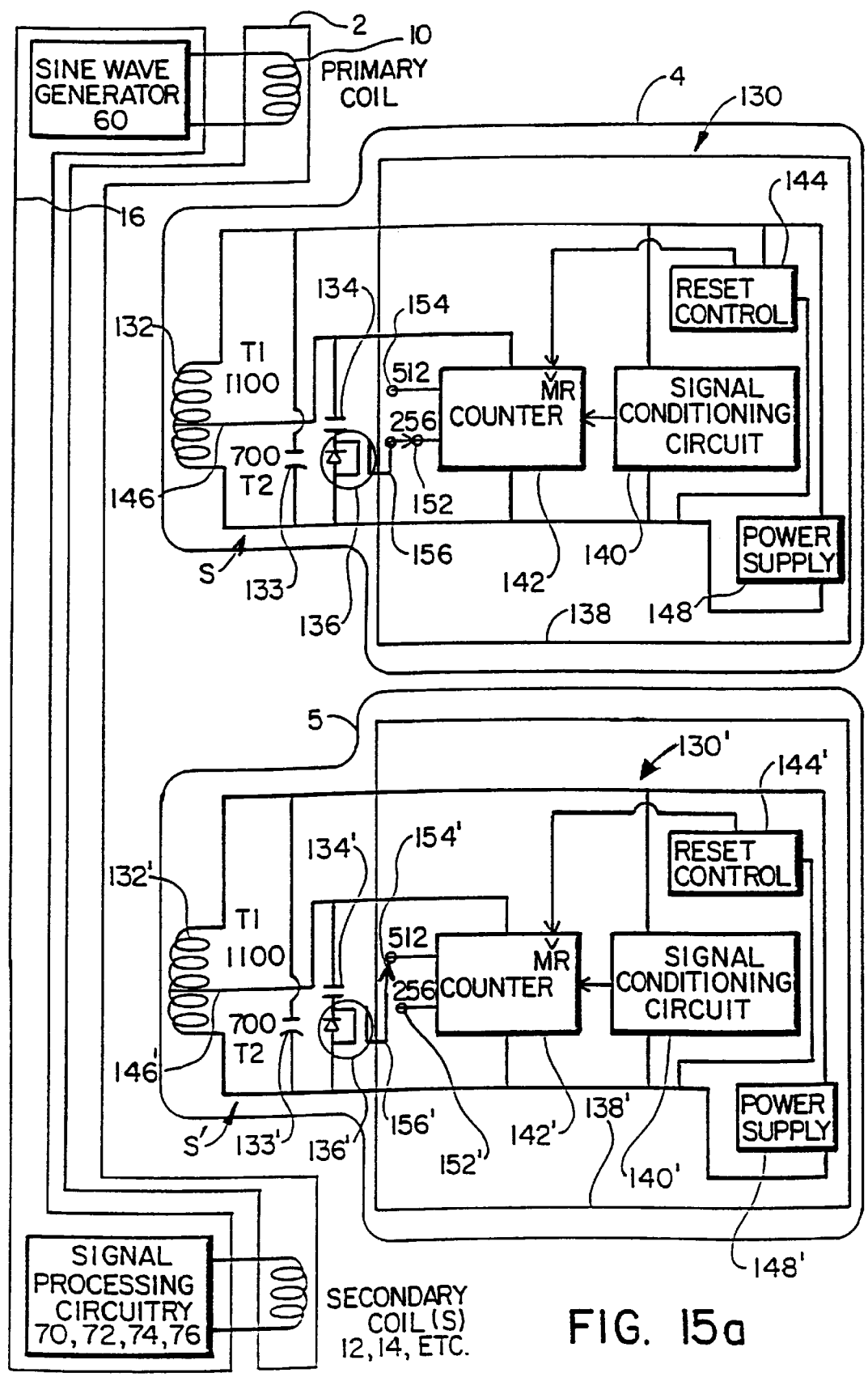
FIG. 15a is a schematic representation of magnetic coupling between the primary coil, the secondary coils and two floats as shown in FIG. 14.

With reference to FIGS. 15a and 15b and with ongoing reference to FIG. 14, the float 4 having the LC resonator 130 and the float 5 having an LC resonator 130' are adapted to measure the respective level of oil on water and the level of water in the same tank. The LC resonator 130' is similar to the LC resonator 130 where like elements are identified by like numbers. However, the second output 154' of the counter 142' is connected to the switch control lead 156' of the switch 136'.

In operation, the sine wave generator 60 excites the primary coil 10 with a signal at the first frequency for a first interval 158. The first frequency causes the reset controls 144, 144' to reset their respective counters 142, 142' and causes components of the power supplies 148, 148' to store electrical charge therein. After the first interval 158, the sine wave generator 60 excites the primary coil 10 with a signal at the second frequency. During a second interval 160 corresponding to cycles 0–255 of the second frequency, the switches 136, 136' are open and the resonating circuits S, S' are inactive. During the second interval, the control system 16 samples from each secondary coil 12, 14, etc., a compensation signal. During a third interval 162 corresponding to cycles 256–511 of the second frequency, the resonating circuit S' is inactive and the resonating circuit S of the float 4 is active thereby producing a locally intense electromagnetic field. During the third interval 162, the control system 16 samples from each secondary coil 12, 14, etc., a first composite signal. During a fourth interval 164, which begins at cycle 512 of the second frequency, the resonating circuit S of the float 4 is inactive and the resonating circuit S' of the float 5 is active. During the fourth interval 164, the control system 16 samples from each secondary coil 12, 14, etc., a second composite signal. To detect the response of each secondary coil 12, 14, etc., to the resonating circuit S, the control system 16 subtracts the compensation signal for each secondary coil 12, 14, etc., from the first composite signal thereof to obtain a first elemental signal corresponding to the actual response of each secondary coil 12, 14, etc., to the resonating circuit S. Similarly, to detect the response of each secondary coil 12, 14, etc., to the resonating circuit S', the control system 16 subtracts the compensation signal for each secondary coil 12, 14, etc., from the second composite signals thereof to obtain a second elemental signal corresponding to the actual response of each secondary coil 12, 14, etc., to the resonating circuit S'.

With ongoing reference to FIGS. 12–15b, it can be seen that the excitation frequency of the primary coil 10 causes each switch 106, 106', 136, 136' to be open during a first interval and to be closed during a second interval. The switches 106, 106' have at least a portion of their respective first intervals occurring during a common interval of time. Similarly, switches 136, 136' have at least a portion of their respective first intervals occurring during a common interval of time. Importantly, where two or more floats, e.g., 4 and 5, having resonating circuits R, R' are utilized, the second interval of each float is adapted to occur at a different interval of time. Moreover, the embodiments shown in FIGS. 14 and 15a are also responsive to a frequency other than the resonant frequency of the resonating circuits S, S' to charge the power supplies 148, 148' and generate reset signals which reset the counters 142, 142'.

The embodiments described in connection with FIGS. 12–15b can be applied to fluid level sensors having one or more secondary coils. Moreover, the activation of the resonating circuits R, R', S, S', as well as the interval utilized to obtain the compensation signal, can occur in any order. Moreover, each interval can be separated in time from other intervals.

With reference back to FIG. 4, in order to obtain the compensation signal for each of the secondary coils 12, 14, etc., when utilizing the LC resonator D, the float 4''' is separated from the tube 2. The control system 16 then samples a compensation signal response of each secondary coil 12, 14, etc., to stimulation by time varying electromagnetic fields produced by the primary coil 10. The compensation signal for each secondary coil 12, 14, etc., is stored in a memory of the control system 16 for subsequent subtraction from the composite signal for each secondary coil 12, 14, etc., when the float 4''' is adjacent the tube 2. Alternatively, the control system 16 excites the primary coil 10 at one or more non-resonant frequencies of the LC resonator D. The response of each secondary coil 12, 14, etc., is determined for each of the one or more non-resonant frequencies and suitable numerical adjustments are made thereto in order to determine an estimated compensation signal that corresponds to the compensation signal measured when the float 4''' is separated from the tube 2.

With ongoing reference to FIG. 4, the third secondary coil 40 has one winding cycle between the ends of the tube 2 and has a winding density distribution that varies linearly between the ends of the tube 2. The third secondary coil 40 is wound whereby a float positioned adjacent one end thereof produces a positive peak, and the float adjacent the other end thereof produces a negative peak. If, however, the winding density distribution of the third secondary coil 40 is shifted by one-half cycle, the winding density distribution at opposite ends of the third secondary coil 40 are the same, i.e., zero. Hence, the third secondary coil 40 will generate the same signal when the float 4''' is positioned at either end thereof. To avoid generating the same signal at opposite ends of the third secondary coil 40, the ends thereof are wound in a non-periodic manner. Specifically, the third secondary coil 40 is wound so that the coil density distribution at opposite ends thereof does not return to zero. Hence, the third secondary coil 40 can accurately detect the position of the float 4''' at one end of the tube 2.

The tube 2 and the coils 10, 12, 14, etc., wound thereabout, can be rigid or flexible. To secure the primary coil 10 to the tube 2, a length of tape having an adhesive on one side thereof is wound around the tube 2 with the adhesive side exposed. The primary coil 10 is then wound onto the adhesive side of the tape in a desired manner. Similarly, another length of tape having adhesive on one side thereof is wound around the primary coil 10 with its adhesive side exposed. The first secondary coil 12 is secured to the exposed adhesive side in a desired winding pattern. Subsequent coils are wound around the tube 2 in a similar manner. It is to be appreciated that tape having adhesive on both sides can also be utilized. Moreover, when all of the coils have been wound around the tube 2 an electrical insulating sheath can be wrapped around the coils.

The following is a computer program listing utilized by the control system 16 to interpret the signals from the secondary coils and convert the signals to position data. Presented below is the program interpreting the signals written in BASIC.

```
'$INCLUDE: '451ibl.dcl'
'*********************************************** Mar. 13, 95 **
'******************* OILSENS.BAS**************************
'**** Program for measurements of oil level using nonlinear multiple ****
'**** transformer                                                    ****
'****         Copyright 1995 Dr. Robert Czarnek                      ****
'****************************************************************
'************ Before execution type QB /L 451ibl ****************
DIM iczas(1000), vout(1000), vmcstek(1000), vcisn(1000), vsensor(1000)
SCREEN 9
CLS
SelectComPort 1
mode = 0        '0 = no 1 = yes
ScrPrnt mode    'sets communication SCReen PRiNTing MODE on or off
Clr             'CLeaRs the power up error
'****************** FIRST SCREEN *********************
LOCATE 8, 26
PRINT "PROGRAM FOR TESTING OIL SENSOR"
LOCATE 10, 22
PRINT "System designed by Dr. Robert Czarnek"
LOCATE 20, 1
FOR i = 1 TO 50
        LOCATE 11, 22
        PRINT "--------------------------------------"
NEXT i
CLS
'**************** SECOND SCREEN *****************
'********Initial parameters**********
Pi = 3.141592654#
cycle = 158
Ncycle = 0
alphalast = Pi
Vx0 = 1
Vy0 = 0
VLmin = .64
VLmax = 4.67
'****************************************
'************** Quadrature analysis ****************
200 '
ReadAnalogInp 1, Vx
ReadAnalogInp 2, Vy
ReadAnalogInp 0, VL
'ReadAnalogInp 3, Vempty
LOCATE 2, 1
PRINT USING "Ch0 = ##.##"; VL
PRINT USING "Ch1 = ##.##"; Vx
PRINT USING "Ch2 = ##.##"; Vy
level0 = (VL - VLmin) * 1264 / (VLmax - VLmin)
Vx = Vx - 2.5
Vy = Vy - 2.5
IF ABS(Vx) >= ABS(Vy) THEN
tang = Vy / Vx
alpha = ATN(tang)
    IF Vx < 0 THEN
        IF Vy >= 0 THEN alpha = alpha + Pi
        IF Vy <0 THEN alpha = alpha - Pi
    END IF
    GOTO 210
END IF
IF ABS(Vx) < ABS(Vy) THEN
    tang = Vx / Vy
    alpha = ATN(tang)
    alpha = Pi / 2 - alpha
    IF Vy < 0 THEN alpha = alpha - Pi
END IF
210 alpha = alpha + Pi
IF (alphalast - alpha) > Pi THEN Ncycle = Ncycle + 1
IF (alpha - alphalast) > Pi THEN Ncycle = Ncycle - 1
alphacycle = alpha * cycle / (2 * Pi)
'********************* Linearization ***********************
    alphaerror = -5.662924E-11 * alphacycle ^ 6
    alphaerror = alphaerror + 3.323361E-08 * alphacycle ^ 5
    alphaerror = alphaerror - 7.132682E-06 * alphacycle ^ 4
    alphaerror = alphaerror + 6.869602E-04 * alphacycle ^ 3
    alphaerror = alphaerror - .029739 * alphacycle ^ 2
    alphaerror = alphaerror + .561295 * alphacycle
    alphaerror = alphaerror - 2
    alphacycle = alphacycle - alphaerror
'***********************************************************
```

-continued

```
220 '
level = Ncycle * cycle + alphacycle
IF (level - level0) * 2 > cycle THEN
    Ncycle = Ncycle - 1
    GOTO 220
END IF
IF (level0 - level) * 2 > cycle THEN
    Ncycle = Ncycle + 1
    GOTO 220
END IF
PRINT USING "Voltage x = ##.##"; Vx
PRINT USING "Voltage y = ##.##"; Vy
PRINT USING "Displacement within cycle = ####mm"; alphacycle
PRINT USING "Total displacement = #### mm"; level
PRINT USING "Ncycle = ###"; Ncycle
PRINT USING "Voltage L = ##.##"; VL
PRINT USING "Level linear sensor = ####"; level0
'*** Level dial indicator ***
LINE (400, 200)-(400 + 100 * SIN(alphalast), 200 - 75 * COS(alphalast)), 0
CIRCLE (400, 200), 100, 3
LINE (400, 200)-(400 + 100 * SIN(alpha), 200 - 75 * COS(alpha))
LINE (550, 340)-(600, 340 - level / 4.5), 4, BF 'red
LINE (550, 340 - level / 4.5)-(600, 30), 15, BF 'white
alphalast = alpha
'*** Linear level indicator ***
LOCATE 13, 48
PRINT USING "#####"; level
LINE (610, 340)-(615, 340 - level0 / 4.5), 4, BF 'czerwony
LINE (610, 340 - level0 / 4.5)-(615, 30), 15, BF 'bialy
GOTO 200
END
```

The sensor system provides a system with improved accuracy and fewer moving parts to increase reliability over the prior art, as well as providing a sensor that is not sensitive to float clearance, needs cleaning about once every three years, has a continuous readout, low cost of manufacture and a low sensitivity to shock and storms.

The present invention is also a displacement measuring sensor system for non-fluid applications. Specifically, the previously described floats can be fixed to a mechanical member, such as a movable arm or a fixed surface, and the respectively described tube/coil arrangements can be attached to a movable arm or a fixed surface.

FIGS. 16a–16d show four arrangements having a first member 200 and a second member 210 where any one of the previously described floats 4, 4', 4", 4''', etc., herein generally designated as the second member 210 and the corresponding coil arrangements that include a primary coil 10 and one or more secondary coils 12 and other coils 14, 40, etc., herein generally designated as the first member 200. The second member 210, the first member 200 and appropriately previously described electronics form a sensing system for measuring displacement.

Figure 16A:
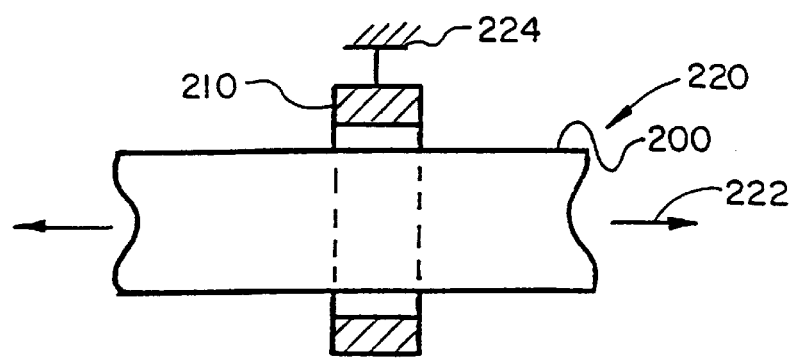
FIGS. 16a–16d are schematic views showing sensing systems for measuring displacement made in accordance with the present invention.

Specifically, FIG. 16a shows a sensing system 220 for measuring displacement where the first member 200 is adapted to move along an axis 222 and the second member 210 is ring shaped defining an opening and fixed to a surface 224. The first member 200 is adapted to move relative to the second member 210.

Figure 16B:
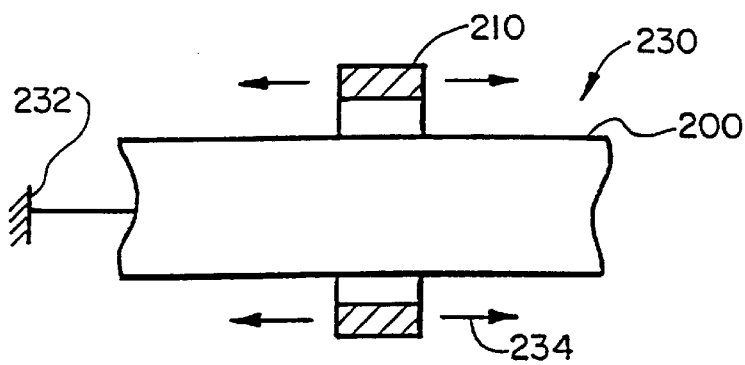

FIG. 16b shows a sensing system 230 for measuring displacement similar to the sensing system 220 for measuring displacement as shown in FIG. 16a, except the first member 200 is fixed to a surface and the second member 210 is adapted to move along an axis 234. The second member 210 is adapted to move relative to the first member 200.

Figure 16C:
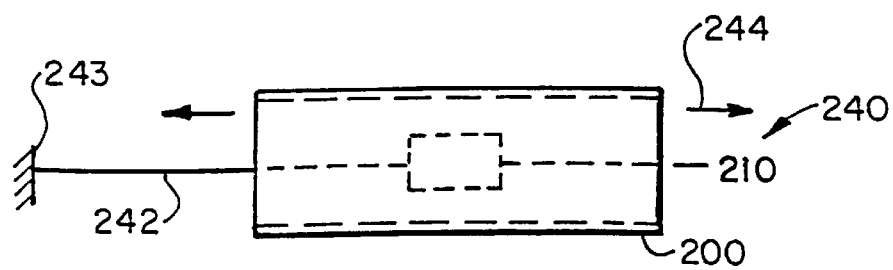

FIG. 16c shows a sensing system 240 for measuring displacement similar to the sensing system 220 for measuring displacement as shown in FIG. 16a, except the second member 210 is secured to a rod 242 coupled to a surface 243.

The second member 210, which can be plug shaped as shown in FIG. 3, is received within the first member 200, which is tubular shaped, such as shown in FIG. 3. In this arrangement, the first member 200 is adapted to move along an axis 244 relative to the second member 210.

Figure 16D:
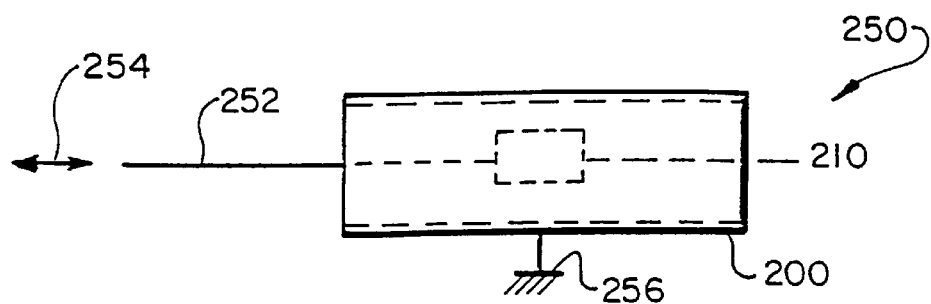

FIG. 16d shows a sensing system 250 for measuring displacement similar to the sensing system 230 for measuring displacement as shown in FIG. 16b, except the second member 210, which can be plug shaped as shown in FIG. 3, is attached to a rod 252 and is adapted to move along an axis 254. The first member 200 is attached to a surface 256 and is tubular shaped as shown in FIG. 3 so that the second member 210 is received within the first member 200. In this arrangement, the second member 210 is adapted to move along the axis 254 relative to the second member 210. It should be noted that the axes 222, 234, 244 and 254 can be straight lines or curved and it is also possible that both the first member 200 and the second member 210 can move relative to each other.

The sensing system for measuring displacement can be used in many applications, such as: automotive applications for position feedback, active suspension, throttle control or active power steering; robot automation feedback, such as arms and jaws; aircraft flap extenders, thrust reversers, wheel extenders or control surface management; hydraulic cylinder extension or retraction; pneumatic cylinder extension or retraction; large machines, such as wood lathes, tool position measurement and feedback; process equipment positioning and conveyor movement, such as for example: position measurement of hot steel ingots; food processing equipment, such as squeezers and crushers; earth moving machinery; fruit picking machines; control of automated paint sprayers and welders; use in areas of severe environments involving chemicals, vapors, heat, dust, etc. where optical systems cannot be maintained; use in spacecraft for position feedback; use for monitoring of structural components of a space station; use on satellites where long term reliability and low power consumption are required; feedback on solar panel positioning device; geomechanics, earthquake monitoring and damage protection; artificial limb position feedback; gaging; valve position feedback; part thickness measurements; roller gap measurements in steel mills, paper mills, etc.; and medical instrumentation.

Figure 17:
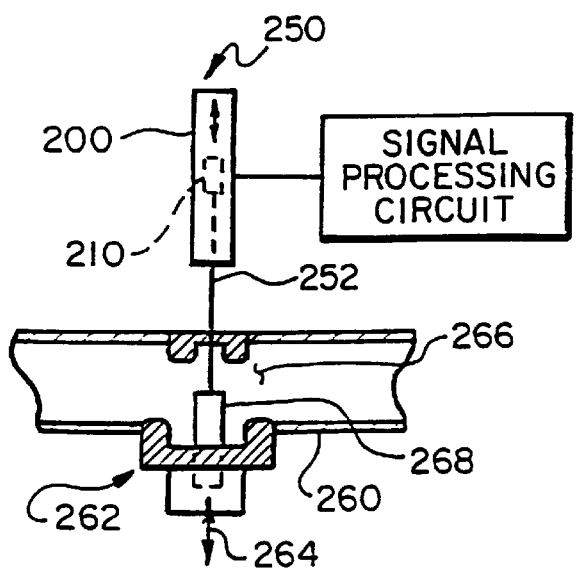
FIG. 17 is a sensing system for measuring displacement used in a valve.

More specifically, FIG. 17 shows a valve positioning arrangement utilizing the sensing system 250 for measuring displacement that includes a flow pipe 260 in fluid communication with a gate valve 262 adapted to move along an axis 264 to adjust a fluid flow opening 266 moved by the rod 252 attached to a gate 268 of the gate valve 262, whereby the position of the second member 210 relative to the first member 200 determines the size of the flow opening 266.

Figure 18:
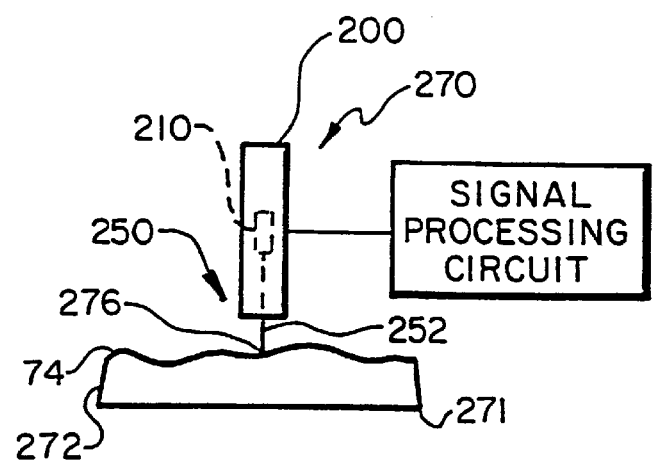
FIG. 18 is a sensing system for measuring displacement made in accordance with the present invention for measuring a thickness of a part.

FIG. 18 shows an arrangement for measuring a thickness of a part 270 relative to a reference point 271 utilizing the sensing system 250 for measuring displacement including a part 272 having a part surface 274. An end 276 of the rod 252 is adapted to contact the part surface 274 causing the second member 210 to be positioned within the first member 200.

Figure 19:
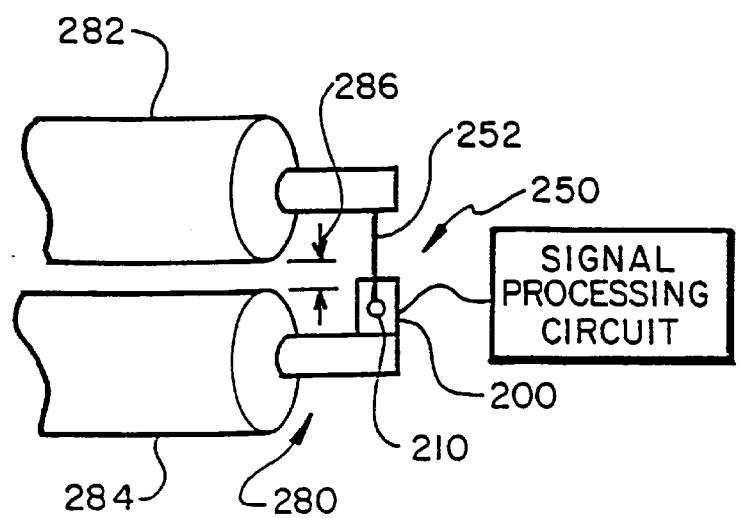
FIG. 19 is a sensing system for measuring displacement made in accordance with the present invention for measuring a gap between rollers.

FIG. 19 shows an arrangement 280 for measuring a gap between rollers used, for example, in the metal industry or in paper mills, rubber, plastic sheets and film plants and includes a first roller 282 and a second roller 284. A gap 286 is defined between the rollers 282 and 284. A sensing system 250 for measuring displacement is coupled to the rollers 282 and 284 so that the rod 252 is coupled to the roller 282 and the second member 210 is coupled to the roller 284. The gap 286 corresponds to the position of the second member 210 within the first member 200. In the above arrangements, the first member 200 is coupled to an appropriate signal generator and signal processing circuit as previously discussed. Also, the signal processing circuit can be coupled to a control circuit and used for feedback control, for example, with the gate valve 262 (FIG. 17) and the rollers 282 and 284 (FIG. 19). Although, not shown, it is possible to utilize two second members 210 in combination with one first member 200 by using the arrangement such as disclosed in FIG. 15a and previously described herein. This arrangement can be used to measure the displacement of two parts relative to the first member 200.

Figure 20:
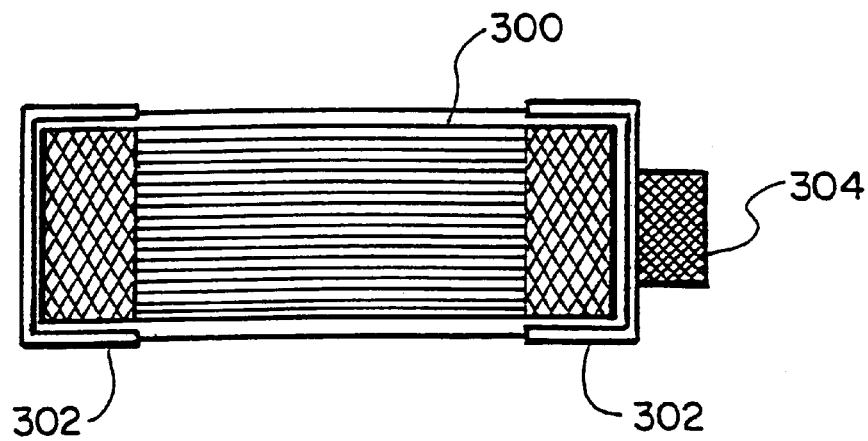
FIG. 20 is a schematic view of a section of a coil having a ferromagnetic shield made in accordance with the present invention.

FIG. 20 shows a resonator coil second member or a float 300 similar to the resonator coil shown in FIG. 4 further having a ferromagnetic shield 302 surrounding at least a portion of the coil 300. The resonator coil 300 which also includes a capacitor 304 can be positioned on either side of the shield 302. The shield 302 prevents extraneous effects to the sensing system disclosed due to close proximity of ferromagnetic objects to the resonator coil 300. The other second members 210 described herein can also have a ferromagnetic shield, if necessary.

Figure 21B:
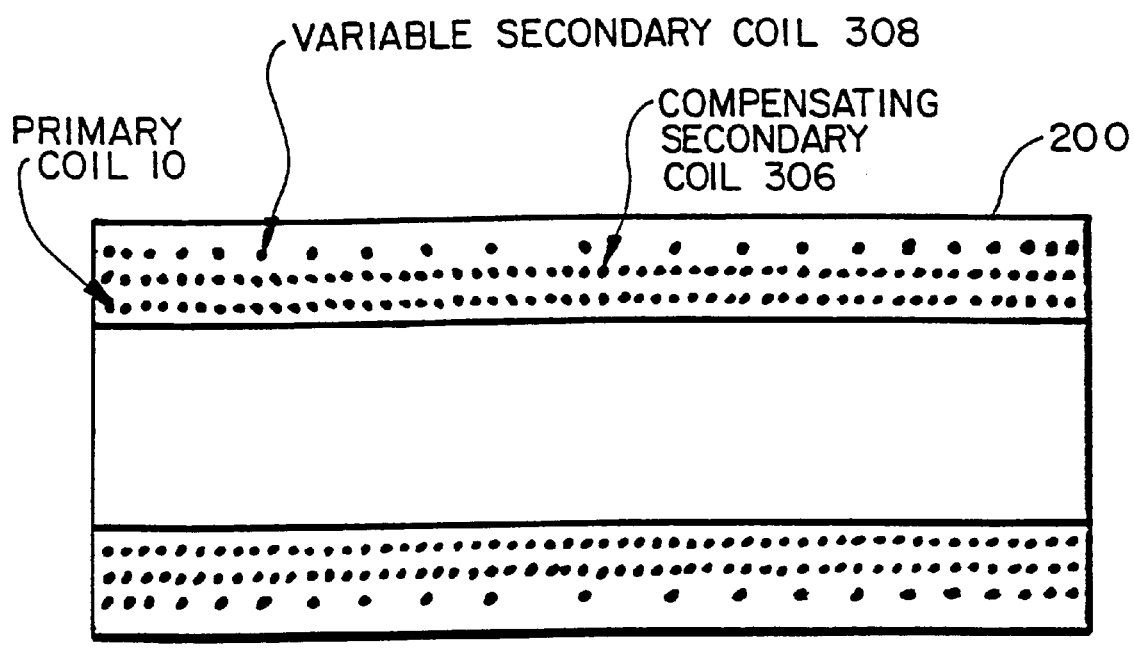
Figure 21A:
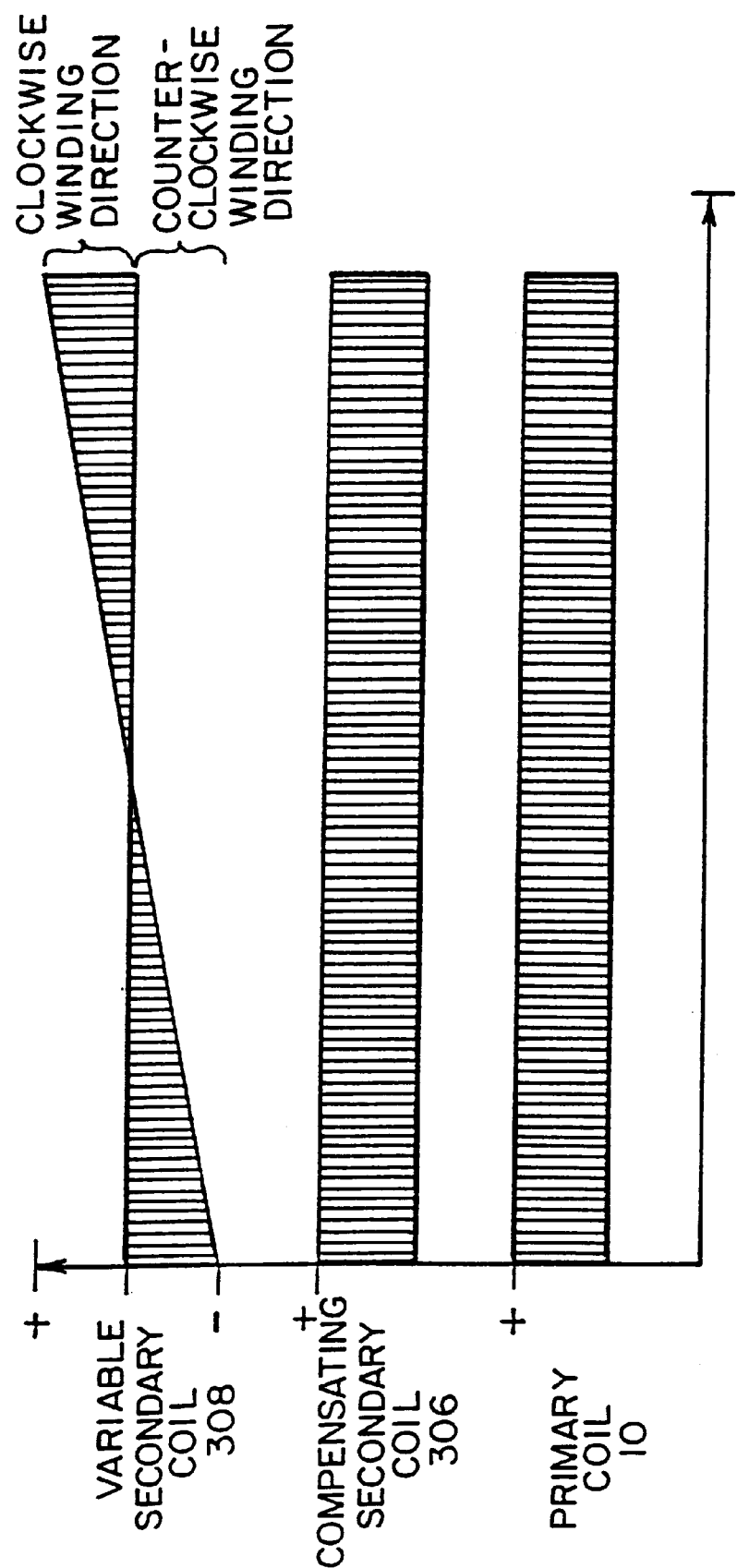
FIG. 21a is a schematic of a winding density distribution including winding direction of a variable secondary coil of a portion of a section made in accordance with the present invention.

FIGS. 21a and 21b show a further embodiment of the first member 200 of the present invention that uses a primary coil 10 having constant windings per unit length, a compensating secondary coil 306 having constant windings per unit length and a variable secondary coil 308 with a winding density that varies linearly in accordance with equation 2. Thus, the coil density of the variable secondary coil 308 equals zero intermediate the ends of the variable secondary coil 308. The compensating secondary coil 306 assists in compensating for changes in the signal application of the variable secondary coil 308 due to effects caused by extraneous ferromagnetic objects. In operation, the first member 200 and the second member 210 are calibrated with a first time varying signal passing through the primary coil 10. A signal processing circuit (not shown) measures the generated signals through the secondary coils 306 and 308. The signal measured in secondary coil 306 is constant with respect to the position of the second member 210 and the signal measured in the secondary coil 308 varies with respect to the position of the second member 210 along the length of the first member 200. The secondary coil 306 can be calibrated to be a constant one volt and the secondary coil 308 can be calibrated to be between −1 volt and +1 volt depending on the position of the second member 210 relative to the first member 200. It has been found that should a ferromagnetic object be placed in close proximity to the first member 200, both of the secondary coils 306 and 308 will be affected equally. Therefore, after calibration and installation of a system utilizing the first member 200 and the second member 210, the system can become self-compensating should a ferromagnetic member affect the signal of the secondary coils 306 and 308. As an example, should the signal processor detect that the signal of the compensating secondary coil 306 reads 0.5 volts and its calibrated signal is 1 volt, then the voltage signal of the variable secondary coil 308 should be multiplied by a factor of 2 (1 divided by 0.5) to yield a compensated variable secondary signal. This assumes that the signal passing through the primary coil is constant. In other words, it has been found that the following relationship applies:

$$\frac{\text{(calibrated voltage of the variable secondary coil 308)}}{\text{(calibrated voltage of the compensating secondary coil 306)}} = \frac{\text{(measured voltage of the variable secondary coil 308)}}{\text{(measured voltage of the compensating secondary coil 306)}}$$

The compensating secondary coil 306 can be used with other secondary coils previously described with or without the variable secondary coil 308.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A displacement measuring sensor system, comprising:

a first member having a first end, a second end and a longitudinal axis extending therebetween;

a second member positioned adjacent the first member between the first end and the second end thereof, the first member and the second member configured to move relative to each other;

a primary coil wound around the longitudinal axis between the first end and the second end of the first member;

a first secondary coil wound around the longitudinal axis at a first periodically varying winding density distribution between the first end and the second end of the first member;

a second secondary coil wound at the first periodically varying winding density distribution around the longitudinal axis between the first end and second end of the first member, wherein the winding density distribution of the second secondary coil is shifted relative to the winding density of the first secondary coil; and a third secondary coil wound at one of a monotonically and a linearly varying winding density distribution around the longitudinal axis between the first end and the second end of the first member.

2. The displacement measuring sensor system as set forth in claim 1, wherein a coil winding direction of at least one of the first and the second secondary coils changes between clockwise and counterclockwise between the first end and the second end of the first member.

3. The displacement measuring sensor system as set forth in claim 2, wherein the first periodically varying winding density distribution of at least one of the first and the second secondary coils varies as one of a sine function and a square function.

4. The displacement measuring sensor system as set forth in claim 3, wherein the winding direction of at least one of the first and the second secondary coils changes where the first periodically varying winding density distribution thereof equals zero.

5. The displacement measuring sensor system as set forth in claim 1, wherein the shift of the second secondary coil relative to the first secondary coil is one of one-quarter and one-eighth of the cycle of the first periodically varying winding density distribution.

6. The displacement measuring sensor system as set forth in claim 1, wherein the first periodically varying winding density distributions of the first and the second secondary coils are repeated N cycles between the first end and the second end of the first member, wherein N is greater than 1.

7. The displacement measuring sensor system as set forth in claim 1, wherein an amplitude of a signal produced by the third secondary coil in response to time varying electromagnetic field varies one of monotonically and linearly in response to movement of the second member between the first end and the second end of the first member.

8. The displacement measuring sensor system as set forth in claim 6, further comprising:
   a third secondary coil wound around the longitudinal axis at a second periodically varying winding density distribution between the first end and the second end of the first member; and
   a fourth secondary coil wound around the longitudinal axis at the second periodically varying winding density distribution between the first end and the second end of the first member, wherein the second periodically varying winding density distribution of the fourth secondary coil is shifted relative to the second periodically varying winding density distribution of the third secondary coil.

9. The displacement measuring sensor system as set forth in claim 8, wherein the third and fourth secondary coils produce in response to time varying electromagnetic field third and fourth signals having amplitudes that vary periodically in response to movement of the second member between the first end and the second end of the first member.

10. The displacement measuring sensor system as set forth in claim 8, wherein the third secondary coil and the fourth secondary coil have one cycle of the second periodically varying winding density distribution between the first end and the second end of the first member.

11. The displacement measuring sensor system as set forth in claim 8, wherein the winding density distribution of the third secondary coil and the fourth secondary coil are repeated M cycles between the first end and the second end of the first member, wherein M is not equal to N.

12. The displacement measuring sensor system as set forth in claim 11, wherein M equals one of (i) N+1 and (ii) a number that does not have a denominator in common with N other than the number one.

13. A displacement measuring sensor system, comprising:
   a first member having a first end, a second end and a longitudinal axis extending therebetween;
   a second member positioned adjacent the first member between the first end and the second end thereof, the first member and the second member configured to move relative to each other, the second member including a resonating circuit;
   a primary coil wound around the longitudinal axis between the first end and the second end of the first member;
   a first secondary coil wound around the longitudinal axis at a first periodically varying winding density distribution between the first end and the second end of the first member; and
   a second secondary coil wound at the first periodically varying winding density distribution around the longitudinal axis between the first end and the second end of the first member, wherein the winding density distribution of the second secondary coil is shifted relative to the winding density of the first secondary coil.

14. The displacement measuring sensor system as set forth in claim 1, further comprising a control system which provides a time varying signal to the primary coil and which receives a first signal, a second signal and a third signal from the respective first secondary coil, second secondary coil and third secondary coil, wherein:
   the primary coil produces a time varying electromagnetic field in response to the provided time varying signal;
   the first secondary coil, the second secondary coil and the third secondary coil produce the respective first signal, second signal and third signal in response to the time varying electromagnetic field; and
   the first signal and the second signal have amplitudes that vary periodically in response to movement of the second member between the first end and the second end of the first member.

15. The displacement measuring sensor system as set forth in claim 1, wherein the first member is a tube.

16. The displacement measuring sensor system as set forth in claim 1, further including an electromagnetic shield positioned between at least one of (i) the primary coil and the secondary coils and (ii) between adjacent secondary coils.

17. A displacement measuring sensor system, comprising:
   a first member having a first end and a second end, the first member extending along a longitudinal axis;
   a primary coil wound around the longitudinal axis between the first end and the second end at a constant winding density distribution;
   a secondary coil wound around the longitudinal axis at a monotonically varying winding density distribution between the first end and the second end;
   a control system connected for exciting the primary coil and for receiving a signal from the secondary coil; and
   a second member, wherein:
   the first member and the second member are configured to move relative to each other; and
   the second member includes a resonator configured to generate a locally intense electromagnetic field in response to excitation of the primary coil by the control system one of at and near a resonant frequency of the resonator.

18. The displacement measuring sensor system as set forth in claim 17, wherein the resonator includes a resonator coil wound around a ferromagnetic core.

19. The displacement measuring sensor system as set forth in claim 18, wherein the ferromagnetic core and the resonator coil are positioned coaxial with the longitudinal axis.

20. The displacement measuring sensor system as set forth in claim 17, wherein the first member is a tube and the second member is positioned one of inside and outside the tube.

21. A displacement measuring sensor system, comprising:
   a first member having a first end, a second end and a longitudinal axis extending therebetween;
   a second member positioned adjacent the first member between the first end and the second end thereof, the first member and the second member configured to move relative to each other;
   a primary coil wound around the longitudinal axis between the first end and the second end of the first member;
   a first secondary coil wound around the longitudinal axis at a first periodically varying winding density distribution between the first end and the second end of the first member; and
   a second secondary coil wound at the first periodically varying winding density distribution around the longitudinal axis between the first end and second end of the first member, wherein:
      the winding density distribution of the second secondary coil is shifted relative to the winding density of the first secondary coil;
      the second member includes a resonating circuit that comprises a capacitor and a switch connected in series, a resonator coil connected in parallel with the series connected capacitor and switch, and a switch control circuit connected to the resonator coil and connected to control the operation of the switch;
      in response to the primary coil producing a time varying electromagnetic field at a first frequency, the resonator coil generates a voltage at the first frequency;
      the switch control circuit controls the switch to be open during a first interval determined by the first frequency;
      the switch control circuit causes the switch to be closed during a second interval determined by the first frequency whereby the capacitor and the resonator coil are connected in parallel; and
      the first interval and the second interval occur at different intervals of time.

22. The displacement measuring sensor system as set forth in claim 17, wherein the resonator comprises a resonator coil connected in parallel with a capacitor.

23. The displacement measuring sensor system as set forth in claim 22, wherein the resonator further comprises:
   a switch connected in series with the capacitor, the series connected switch and capacitor connected in parallel with the resonator coil; and
   a switch control connected in parallel with the resonator coil and connected to control the operation of the switch, wherein:
      in response to the primary coil producing a time varying electromagnetic field at a first frequency, the resonator coil produces a voltage at the first frequency;
      the switch control circuit controls the switch to be open during a first interval determined by the first frequency;
      the switch control circuit causes the switch to be closed during a second interval determined by the first frequency whereby the capacitor and the resonator coil are connected in parallel; and
      the first interval and the second interval occur at different intervals of time.

24. The displacement measuring sensor system as set forth in claim 1, further including a fourth secondary coil wound at the one of the monotonically and linearly varying winding density distribution around the longitudinal axis between the first end and the second end of the first member, wherein the winding density distribution of the fourth secondary coil is shifted relative to the winding density distribution of the third secondary coil.

25. The displacement measuring sensor system as set forth in claim 24, wherein amplitudes of signals produced by the third secondary coil and the fourth secondary coil in response to the time varying electromagnetic field vary one of monotonically and linearly in response to movement of the second member between the first end and the second end of the first member.

26. A displacement measuring sensor system as set forth in claim 1, wherein said second member further comprises a ferromagnetic shield.

27. A displacement measuring sensor system, comprising:
   a first member having a first end, a second end and a longitudinal axis extending therebetween;
   a second member positioned adjacent the first member between the first end and the second end thereof, the first member and the second member configured to move relative to each other;
   a primary coil wound around the longitudinal axis between the first end and the second end of the first member at a constant winding density distribution;
   a variable secondary coil wound around the longitudinal axis at a varying winding density distribution between the first end and the second end of the first member; and
   a compensating secondary coil wound around the longitudinal axis at a constant winding density distribution between the first end and the second end of the first member.

28. The displacement measuring sensor system as set forth in claim 1, further comprising a third member positioned adjacent the first member between the first end and the second end thereof, the first member and the third member configured to move relative to each other, wherein the second member and the third member have a first resonating circuit and a second resonating circuit, respectively.

29. The displacement measuring sensor system as set forth in claim 28 wherein the first and second resonating circuits are tuned to resonate at one of (i) the same frequency and (ii) different frequencies.

30. The displacement measuring sensor system as set forth in claim 13, wherein the resonating circuit includes a resonator coil and a capacitor.

31. The displacement measuring sensor system as set forth in claim 30, wherein the resonator coil is wound around a ferromagnetic core.

32. The displacement measuring sensor system as set forth in claim 13, further comprising a third member positioned adjacent the first member between the first end and the second end thereof, the first member and the third member configured to move relative to each other, the third member including a resonating circuit tuned to resonate at the same or a different frequency than the resonating circuit of the second member.

* * * * *

UNITED STATES PATENT AND TRADEMARK OFFICE
CERTIFICATE OF CORRECTION

PATENT NO. : 6,192,754 B1
DATED : February 27, 2001
INVENTOR(S) : Robert Czarnek It is certified that error appears in the above-identified patent and that said Letters Patent is hereby corrected as shown below:

Column 6,
Line 62, "TA Of" should read -- $T_A$ of --.

Column 8,
Line 13, "float 4" in" should read -- float 4" in --.

Column 10,
Line 66, "float 4" is" should read -- float 4' is --.

Column 28, claim 29,
Line 49, after "in claim 28" insert comma (,).

Signed and Sealed this

Sixth Day of November, 2001

*Attest:*

NICHOLAS P. GODICI
*Attesting Officer*     *Acting Director of the United States Patent and Trademark Office*